US00RE43693E

(19) United States
(12) Reissued Patent
Emrich

(10) Patent Number: US RE43,693 E
(45) Date of Reissued Patent: Oct. 2, 2012

(54) COUPLING ARRANGEMENT

(76) Inventor: Robert K. Emrich, Tigard, OR (US)

(21) Appl. No.: 13/270,475

(22) Filed: Oct. 11, 2011

Related U.S. Patent Documents

Reissue of:
(64) Patent No.: 7,640,685
Issued: Jan. 5, 2010
Appl. No.: 11/518,063
Filed: Sep. 8, 2006

U.S. Applications:
(63) Continuation of application No. 10/665,358, filed on Sep. 22, 2003, now Pat. No. 7,178,274.

(60) Provisional application No. 60/411,762, filed on Sep. 19, 2002.

(51) Int. Cl.
*E02F 9/26* (2006.01)

(52) U.S. Cl. ..... 37/457; 37/453

(58) Field of Classification Search ..... 37/452, 37/453, 454, 455, 456, 457, 458, 459, 232
See application file for complete search history.

(56) References Cited

U.S. PATENT DOCUMENTS 1,890,981 A * 12/1932 Finkl ..... 37/454
2,064,059 A * 12/1936 Fellmeth ..... 37/456
2,435,846 A * 2/1948 Robertson ..... 37/454
2,618,873 A 11/1952 Hostetter
2,805,496 A 9/1957 Jordan
3,120,281 A 2/1964 Peveler et al.
3,952,433 A 4/1976 Heinold et al.
3,997,989 A 12/1976 Stepe
4,056,893 A 11/1977 Willard
4,067,657 A 1/1978 Kaarlela
5,337,495 A 8/1994 Pippins
5,435,084 A 7/1995 Immel
5,718,070 A 2/1998 Ruvang
5,806,215 A * 9/1998 Matthews ..... 37/452
(Continued)

FOREIGN PATENT DOCUMENTS

JP 2001200554 A 7/2001

OTHER PUBLICATIONS

Caterpillar, Inc., First Amended Complaint, *Caterpillar Inc.* v. *ESCO Corporation,* 1:12 cv-01017 (C.D.Il. Feb. 17, 2012)(allegations as to the patent being reissued in the case and other patents as well).

*Primary Examiner* — Jamie L McGowan
(74) *Attorney, Agent, or Firm* — Banner & Witcoff, Ltd.

(57) ABSTRACT

A coupling arrangement for securing two separable components in an excavating operation includes a wear component, a base component and a lock. The lock has a body having a configuration adapted to be received in a hole in the base component, and a rotatable locking member. The locking member includes a flange that is movable between a locking position wherein the flange holds the lock in the assembly and a release position wherein the flange permits the lock to be removed from the assembly. In the release position, the flange sets within the axial extension of the outline of the body. In the locking position, at least part of the flange sets outside the axial extension of the outline of the body. In one construction, the rotation of the locking member to the locking position tightens the fit of the wear component on the base component.

33 Claims, 26 Drawing Sheets

U.S. PATENT DOCUMENTS

| | | | | |
|---|---|---|---|---|
| 5,913,605 | A | | 6/1999 | Jusselin et al. |
| 5,937,550 | A | | 8/1999 | Emrich |
| 5,937,551 | A | | 8/1999 | Moehnke et al. |
| 5,983,534 | A | | 11/1999 | Robinson et al. |
| 5,987,787 | A | | 11/1999 | Mack |
| 5,992,063 | A | | 11/1999 | Mack |
| 6,030,143 | A | | 2/2000 | Kreitzberg |
| 6,079,132 | A | | 6/2000 | Clendenning |
| 6,092,958 | A | | 7/2000 | Gale |
| 6,108,950 | A | | 8/2000 | Ruvang et al. |
| 6,125,559 | A | * | 10/2000 | Mullenhour ..... 37/232 |
| 6,301,810 | B1 | | 10/2001 | Fidler |
| 6,374,521 | B1 | | 4/2002 | Pippins |
| 6,385,871 | B1 | | 5/2002 | Quarfordt |
| 6,708,431 | B2 | | 3/2004 | Robinson et al. |
| 7,178,274 | B2 | * | 2/2007 | Emrich ..... 37/453 |
| 2002/0000053 | A1 | | 1/2002 | Adamic et al. |
| 2003/0070330 | A1 | | 4/2003 | Olds et al. |

* cited by examiner

COUPLING ARRANGEMENT

Matter enclosed in heavy brackets [ ] appears in the original patent but forms no part of this reissue specification; matter printed in italics indicates the additions made by reissue.

The present application is a continuation of [co-pending] U.S. patent application Ser. No. 10/665,358 filed Sep. 22, 2003, *now U.S. Pat. No. 7,178,274, which claims the benefit of U.S. Provisional Application No. 60/411,762, filed on Sep. 19, 2002.*

FIELD OF THE INVENTION

The present invention pertains to a coupling arrangement for releasably securing together two separable components. The lock is particularly suited for securing a wear member to a mount in regard to an excavating operation or the like.

BACKGROUND OF THE INVENTION

Wear parts, particularly in the excavating industry, are usually composed of separable components so as to minimize the amount of material that must be replaced when the wear member becomes worn. As an example, excavating teeth are secured along the digging edge of excavating buckets to penetrate and break up the ground in advance of the bucket to improve the collection of earthen material and to protect the digging edge from premature wear. Such teeth usually comprise an adapter, a point or tip, and a lock or retainer to removably secure the point to the adapter.

An adapter is a base component that is fixed to the digging edge of an excavator by welding, mechanical attachment or being cast as an integral portion of the bucket lip. The adapter itself may have multiple parts, particularly in larger sized teeth, but is commonly a single component. In any event, the adapter includes a forwardly projecting nose as a mount for the wear member. The point has a generally wedge-shaped configuration with top and bottom walls that converge to a digging edge. The base or rear end of the point includes a rearwardly opening socket by which the point is received over the adapter nose. The lock is inserted into a passage that is collectively defined by aligned openings in the adapter nose and the point. The passage may extend through a central portion of the tooth, either vertically or horizontally, or be defined externally of the nose to receive an external lock. See, for example, U.S. Pat. No. 6,030,143 to Kreitzberg, U.S. Pat. No. 6,385,871 to Quarfordt, and U.S. Pat. No. 4,965,945 to Emrich.

As can be appreciated, excavating teeth are used often used under arduous conditions. The loads applied to the points, particularly with large mining buckets, can be very large, of various kinds, and continually shifting. It is important to maintain the lock in the defined passage during use so that the point is not lost. Loss of the point not only requires replacement of the point and causes premature wearing of the adapter, but may also damage downstream machinery intended to process the excavated material. Accordingly, the lock is usually fit tightly within the defined passage to inhibit its ejection or loss. The tight engagement can be caused by the insertion of a resilient tightening member in the passage, partially misaligned holes in the adapter and point, or close dimensioning between the holes and the lock. In the past, a large hammer has typically been needed to force the lock into and out of the passage. This tends to be an onerous and time-consuming task for the operator in the field, and exposes the worker to some risk.

There is a need in the industry for a lock that can be easily inserted into and out of the wear assembly without hammering, and yet can effectively hold the wear part in place even under severe conditions.

SUMMARY OF THE INVENTION

The present invention pertains to a coupling arrangement for releasably holding two separable components together. The coupling arrangement is especially suited for use in holding a wear part to a base in excavating operations. Nevertheless, the invention could be used in other environments wherein it is desired to releasably secure one member to another via a lock received into an opening defined by the joined components.

In one aspect of the invention, a lock is adapted for installation and removal without the need for repeated hammer blows. The lock can be installed and removed on site in an easy and quick manner so as to reduce the difficulty and time typically needed to exchange a worn component with a new replacement. This is a particular advantage when the coupling arrangement is used to secure wear parts to large excavating equipment where equipment downtime translates into a significant economic loss. Further, by eliminating the need for hammering, the inventive coupling arrangement reduces the risk to which users have ordinarily been exposed in replacing wear parts in excavating operations.

In another aspect, the inventive coupling arrangement is able to securely hold the components together even under heavy loading. A lock is used that includes a locking member movable between release and locked positions so that the lock can be positively retained in the assembly instead of relying upon the tightness of the fit. Accordingly, the lock is equally retained in the assembly irrespective of whether the components are tightly or loosely fit together. This is a particular advantage when used with parts that experience significant wearing because looseness will invariably develop as one or both of the parts become worn. In this arrangement, the lock remains in the assembly to hold the wear part or other component in place even under arduous conditions and/or the application of heavy, shifting loads—such as may be experienced during an excavating operation.

In one embodiment, the lock of the coupling arrangement includes two members wherein one is movably supported by the other. The movable locking member can be shifted between a first position where it lies within the bounds of the supporting body or base member for receipt of the lock within the assembly, and a second position where it at least partially extends outside of the bounds of the base member to positively retain the lock within the assembly. In a preferred construction, the movable member sets behind a wall of the assembly in the second position to positively prevent removal or ejection of the lock.

In one such embodiment, the inventive coupling arrangement is employed to hold a wear part to a base in an excavating machine. The movable member of the lock is limited to rotational motion and is free of any loading pressure from the wear part while it is moved from one position to the other. Therefore, this member can be rotated between the release and locked positions in an easy, quick and safe procedure for coupling and uncoupling the components together.

In another aspect of the invention, a lock is used to secure a wear part to an adapter or other mount in an excavating machine. A body or base member of the lock is received within an opening defined in the mount. The body includes a bearing portion that sets against an edge of a hole defined in the wear part to prevent removal of the wear part from the mount. A locking member of the lock is selectively movable between locked and release positions to hold or release the lock from the assembly. In a preferred construction, the locking member rotates relative to the body, and a locking portion of the locking member is positioned axially beyond the body to minimize the required size of the opening in the wear part, in order to maximize the strength of the wear part.

In accordance with another aspect of the invention, a lock to hold two components together includes a body having a resilient member with an aperture and a locking component that rotates between release and locked positions. The locking member has a non-circular stem that is received into the aperture of the resilient member. The stem and aperture have corresponding non-circular shapes such that the resilient material deforms when the stem is rotated. The resilient material functions to resist unwanted movement of the locking member but permit actuation of the lock in an easy, reliable and cost-effective manner, and to provide certainty in properly setting the locking member in the release and locked positions.

In one other aspect, the lock comprises a locking member that not only positively retains the lock in the assembly, but also tightens the assembly of one component (e.g., the wear part) on the other (e.g., the mount). In one embodiment, the locking member includes a rotatable cam that can be selectively positioned in a release position where the lock may be inserted into the assembly and a locked position where the cam tightens the connection. Preferably, the cam further includes a portion that sets behind a wall of the assembly in the locked position to positively retain the lock in place.

In one other aspect, a lock in accordance with the present invention is adapted to cooperate with a cap to shield the lock and inhibit the build up of fines around the lock. The movable locking member of the lock is provided with a head that includes structure for (i) effecting rotation of the locking member, (ii) pulling the lock from the joined components, and (iii) facilitating installation, retention and removal of the cap. In a preferred construction, the head includes flats to facilitate rotation of the locking member, a pry edge to engage a pry tool, and chamfered surfaces on the outer and inner sides of the head to enable the cap to be installed and removed from the lock. The pry tool, then, preferably includes gripping surfaces that matingly engage the inner chamfered surfaces (forming the pry edge) to pull the lock from the assembly.

In another aspect of the invention, a wear part (or other component) includes walls that define a socket into which is received a corresponding mount (e.g., an adapter nose). One of the walls in the wear part includes an opening through which is received a lock. The opening includes a rear edge as a bearing surface adapted to abut the lock and retain the wear part to the mount. To provide ample support to withstand the applied loads, the bearing surface encompasses a substantially full thickness of the wall in which the opening is defined. Another side of the opening, however, is defined by a reduced thickness of the wall so as to form a recess into which a portion of the lock can be set to prevent removal of the lock from the assembly.

DETAILED DESCRIPTION OF THE PREFERRED EMBODIMENTS:

The present invention pertains to a coupling arrangement 10 for releasably securing two separable components together. The invention is especially suited for holding a wear part to a base in an excavating operation. A preferred construction for the invention is an excavating tooth, although the scope of the invention is not limited to an excavating tooth.

Figure 1:
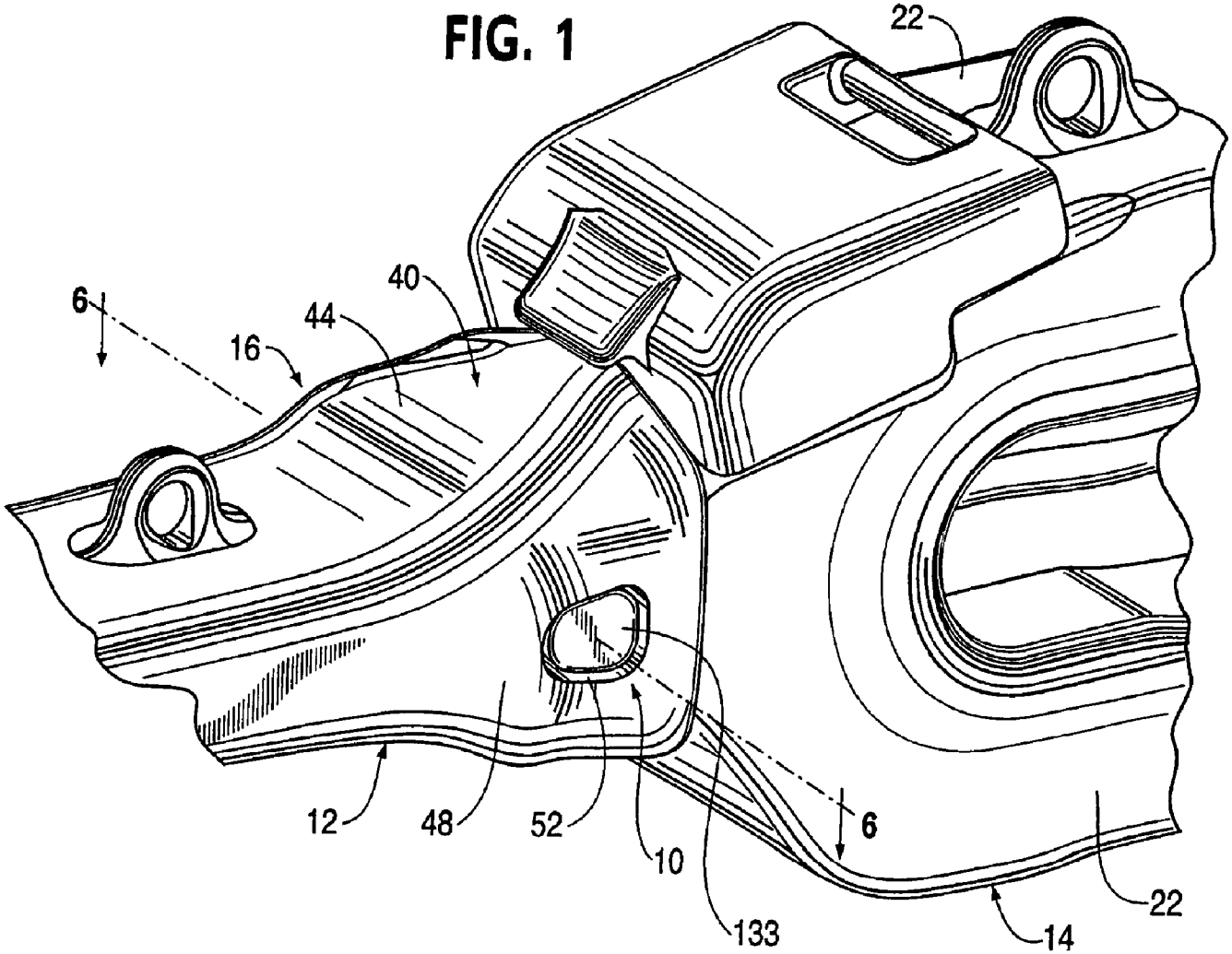
FIG. 1 is a perspective view of an excavating tooth incorporating a coupling arrangement in accordance with the present invention.

As illustrated in FIGS. 1-5, a tooth 12 in accordance with the present invention includes an adapter 14, a point or tip 16 and a lock or retainer 18. The invention in this application is at times described in relative terms, such as "up" and "down," for ease of explanation. These terms generally are to be understood in relation to the orientation of the wear assembly as illustrated in FIG. 1. However, the wear assembly can be placed in all kinds of orientations, and the relative terms used to describe the invention are not intended to be a limitation of the invention.

Adapter 14, as illustrated (FIG. 3), includes a forwardly projecting nose 20 and a pair of bifurcated legs 22 adapted to receive the lip of an excavating bucket (not shown). The legs are adapted to be secured by mechanical means (e.g., by a Whisler style connection), but could also be welded or cast as part of the lip. The adapter could also be composed of multiple parts secured together by a lock or the like, especially in larger sized teeth. In any event, nose 20 typically projects forward to define a mount for point 16 (although the nose could be on the point and the socket defined in the adapter). Nose 20 could be formed to have a wide variety of configurations to meet the needs of the intended usage and/or other factors. As one example, the nose is formed as described in U.S. Pat. No. 5,709,043 to Jones et al., which is hereby incorporated by reference. In the preferred construction, nose 20 includes a pair of converging surfaces 24 and a pair of sidewalls 28. A pocket 32 is formed in one of the sidewalls for receiving lock 18. Pocket 32 has a shape that substantially corresponds to the shape of the lock, and preferably has a non-circular configuration that narrows as it extends toward the front end of the nose. A non-circular shape is preferred to prevent the lock from turning during use. Pocket 32 is defined by a perimeter wall 34 and an inner wall 36. Alternatively, a pocket could be formed in each sidewall 28 to allow for installation of lock 18 on either side of the tooth or for using a lock on each side.

Figure 4:
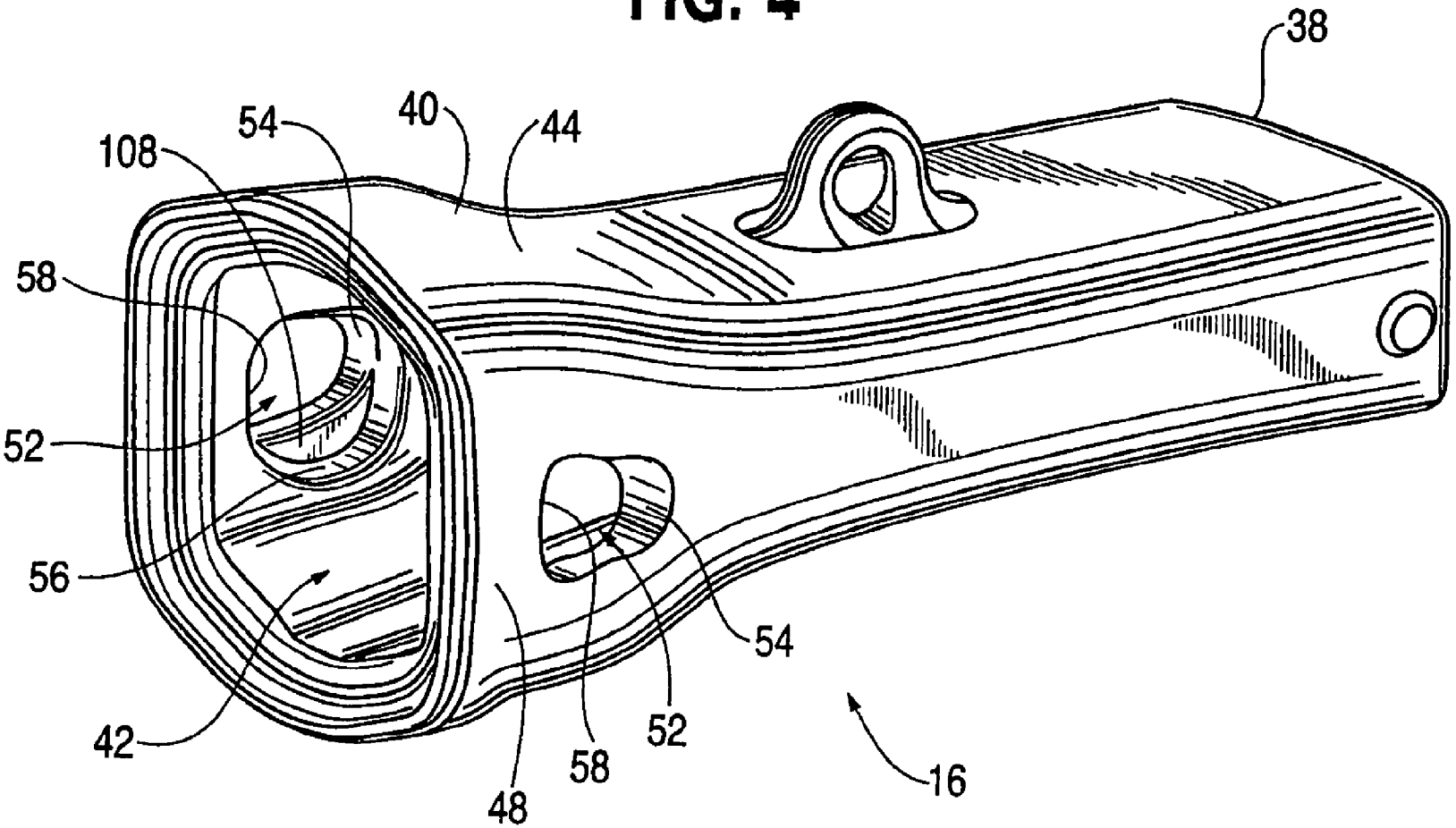
FIG. 4 is a perspective view of the point of the tooth.

Point 16 includes a forwardly projecting digging end 38 and a rear mounting end 40 (FIG. 4). The mounting end has a rearwardly opening socket 42 to receive nose 20 therein. The socket is generally defined by converging walls 44 and sidewalls 48. The inner configuration of the socket is adapted to match the shape of the nose, such as disclosed in U.S. Pat. No. 5,709,043. A hole 52 is preferably formed in both sidewalls 48 so that the point can be reversibly mounted on the adapter for even wearing and longer life. Nevertheless, a single hole 52 in one sidewall 48 could be provided for a non-reversible point. Hole 52 is defined by a peripheral edge 54 and preferably has an outer configuration (i.e., as seen from outside the point), similar to the shape of pocket 32, to receive lock 18. While other shapes for hole 52 could be used, matching the shape of a uniquely shaped lock is preferred to ensure that the lock will be properly oriented when installed in the tooth. Alternatively, the shape of pocket 32 could be relied upon to prevent improper insertion of the lock if hole 52 is shaped and/or sized to permit insertion of the lock in multiple orientations. The peripheral edge 54 defines a recess 56 along a lower portion of hole 52 to receive a part of lock 18, as discussed below. While the recess could be formed along other portions of the peripheral edge 54 (or with multiple recesses), it is preferably not formed along the rear wall portion 58 of hole 52. The rear wall portion 58 spans substantially the full thickness of sidewall 48 to define a bearing surface to abut the lock and retain the point on the adapter even under heavy loading.

Lock 18 preferably includes two primary components—namely, a body or base member 60 and a locking member 62 (FIGS. 6-15). Body 60 preferably comprises a rigid retaining member 63 and a resilient member 64. Locking member 62 is mounted to body 60 for movement between a release position wherein the lock can be installed into or removed from the tooth (or other assembly), and a locked position wherein the lock is retained in the tooth.

In a preferred construction, retaining member 63 (FIGS. 6-13) has a base 66 formed with a configuration to substantially match the shape of pocket 32 in nose 20. The base is a hollow structure defining a cavity 68, which has a generally D-shaped configuration that includes flat peripheral surfaces 70 and an inner surface 71. A rim 72 is provided on an outer side of base 66. Rim 72 extends forward and rearward of base 66 to define locator faces 74 that are adapted to abut sidewall 28 of nose 20 and thereby properly locate the lock in pocket 32. The rear portion 72a of rim 72 is preferably enlarged to provide an ample bearing surface to abut against rear wall portion 58 of point 16 and thereby retain the point on the adapter. Also, as described below, rear portion 66a of base 66 has a longer extension than front portion 66b to provide sufficient resistance for the expected applied loads. Retaining member 63 preferably has a central, shallow depression 75 for receiving a projection 77 of locking member 62 along a front side. This depression is provided to lessen the extension of head 106 and minimize the overall length of the lock. The depression is preferably formed by the provisions of raised stops 81, 83 on the front or outer face of the retaining member—with one stop 81 extending along the top of the depression and one stop 83 extending along the front of the depression. A bore 85 connects depression 75 and cavity 68. Bore 85 permits locking member 62 to extend through retaining member 63.

Figure 11:
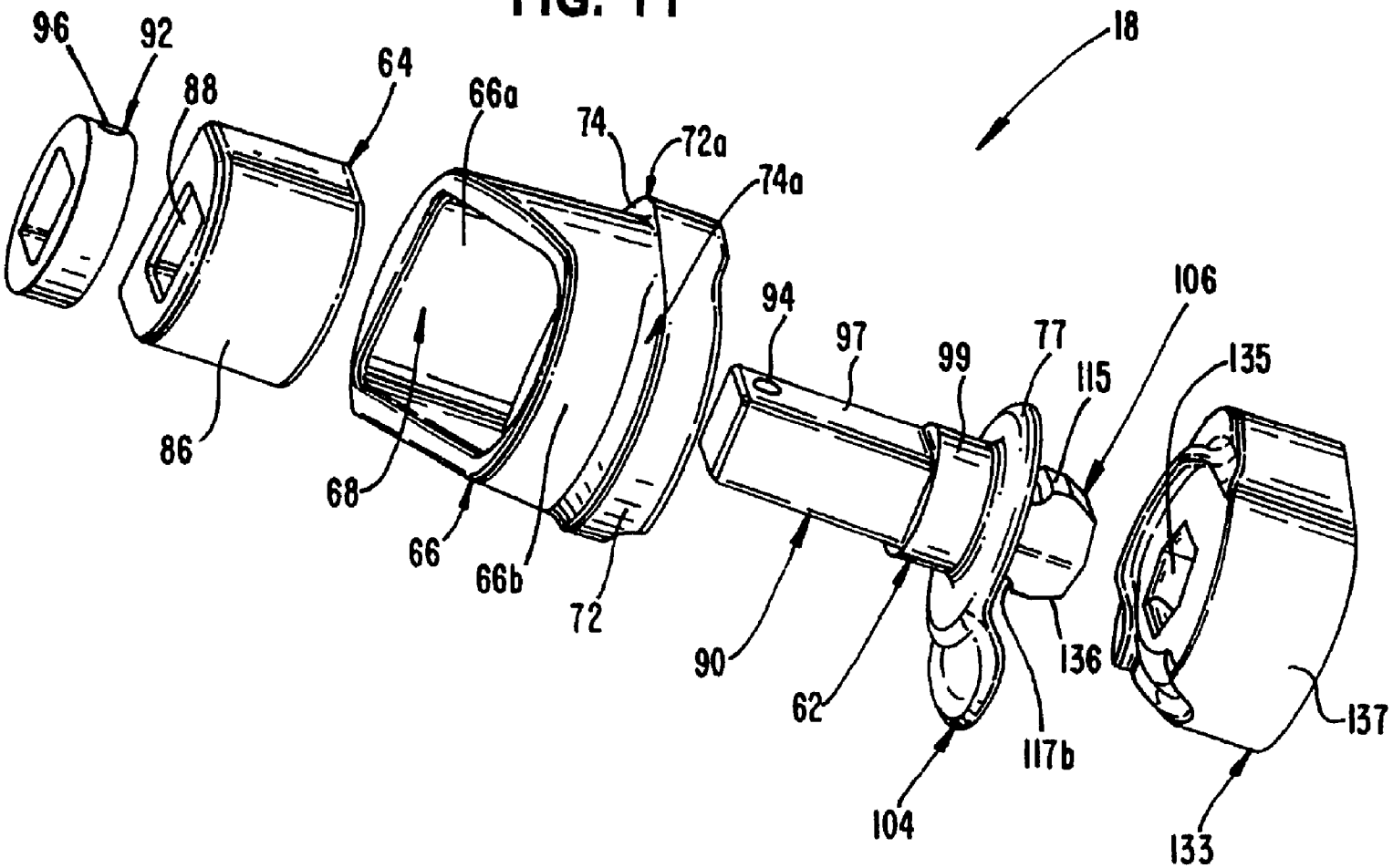
FIG. 11 is an exploded, perspective view of the lock.

Resilient member 64 is preferably formed as a one-piece elastomer formed of rubber of the like (FIG. 11). Resilient member 64 is fit within cavity 68 and thus has an outer surface 86 shaped to generally match the interior walls of the cavity. The flat surfaces 70 prevent any turning of resilient member 64 in the retaining member, although other arrangements could be used. Resilient member 64 sets against inner wall 71 and includes an axial passage 88 having a square or other non-circular cross sectional configuration. Axial passage 88 is aligned with bore 85.

Figure 14:
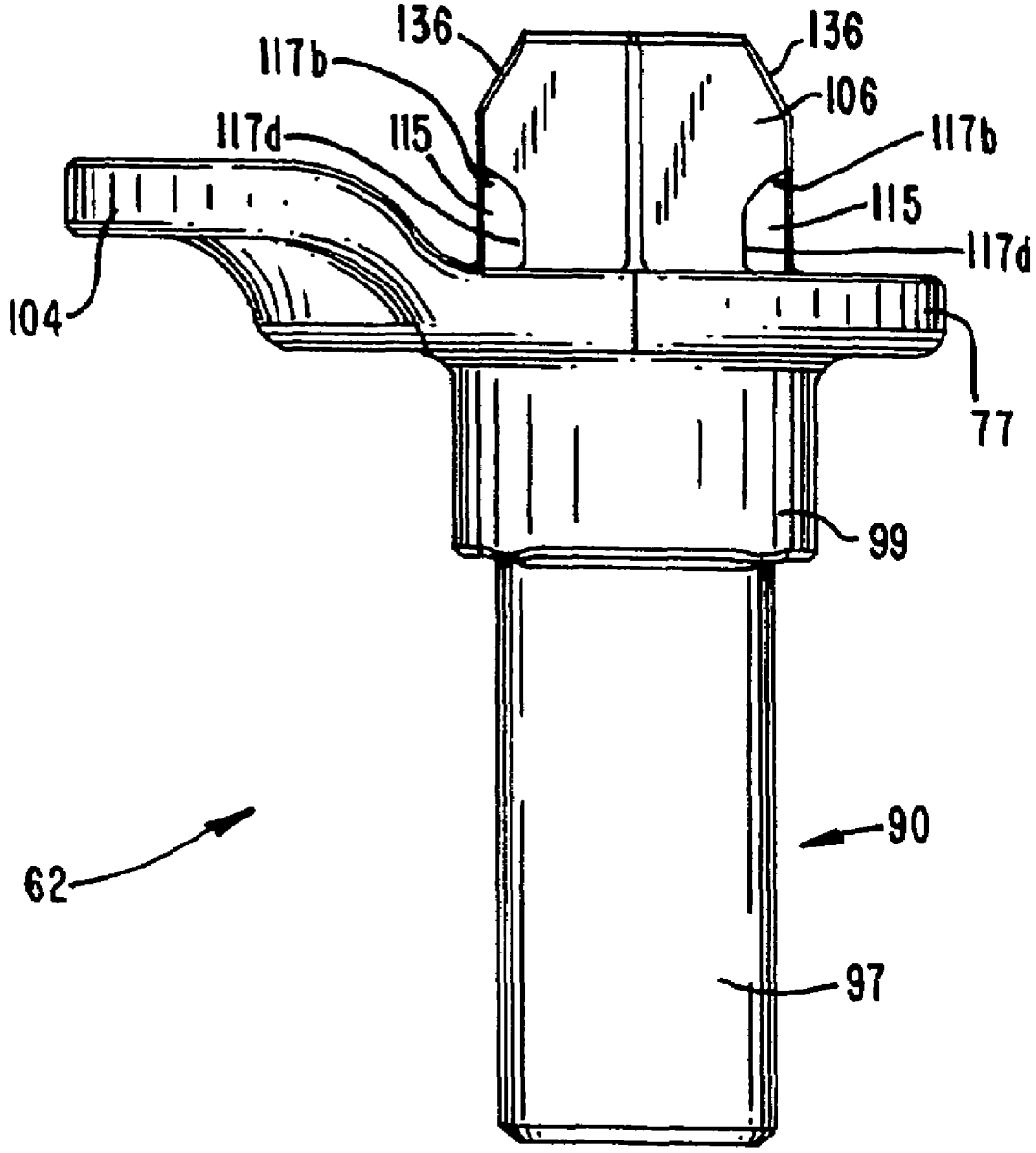
FIG. 14 is a bottom view of the locking member of the lock.
Figure 15:
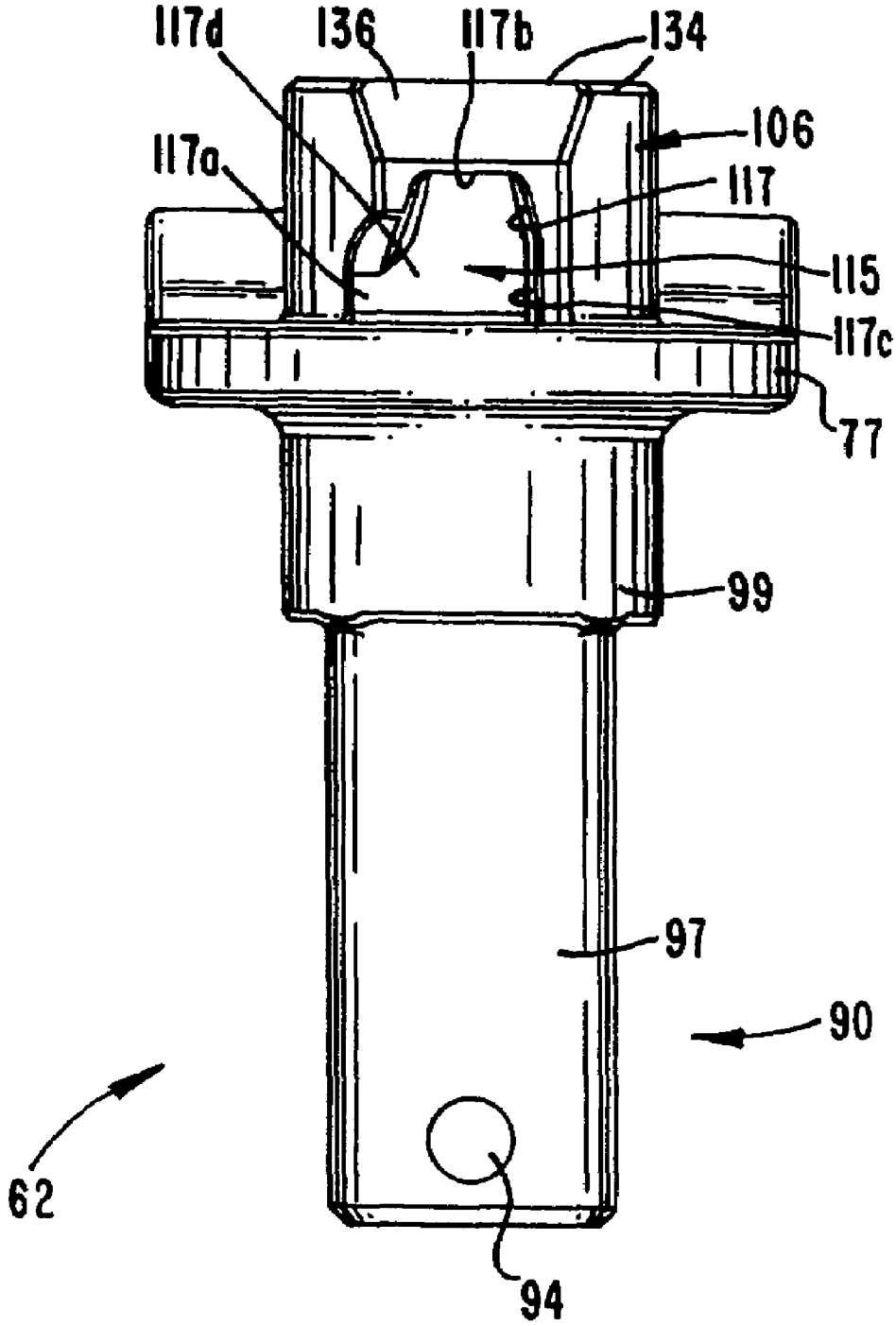
FIG. 15 is a side view of the locking member of the lock.

Locking member 62 is preferably a rigid, unitary member having a stem 90 that is received through bore 85 in retaining member 63 and axial passage 88 in resilient member 64 (FIGS. 11, 14 and 15). Stem 90 is longer than body 60 so that it extends inward beyond resilient member 64. In the preferred construction, a collar 92 is fixed to the stem by a roll pin (not shown) passed into holes 94, 96. However, other means could be used to fix the collar to the stem or to replace the collar in holding the body and locking member together. The resilient member is trapped between collar 92 and inner surface 71. Stem 90 preferably has a shank portion 97 having a square cross section along most of its length to match the shape of axial passage 88, however, other non-circular shapes could be used. Stem 90 also includes a circular portion 99 to closely fit in bore 85 for stabilizing locking member 62 relative to retaining member 63.

Projection 77 is fixed to stem 90 and, in cooperation with collar 92, secures locking member 62 to body 60. Projection 77 sets in depression 75, although it could simply set in front of retaining member 63 (i.e., without the depression). A flange or tab 104 extends beyond 77 along one of its sides, which, as described below, functions to retain lock 18 in tooth 12. Alternatively, a plurality of flanges or the like could also be used to secure the lock in place. Stem 90 terminates in a head 106 that includes flats 107 or other means to facilitate rotation of locking member 62.

Figure 2:
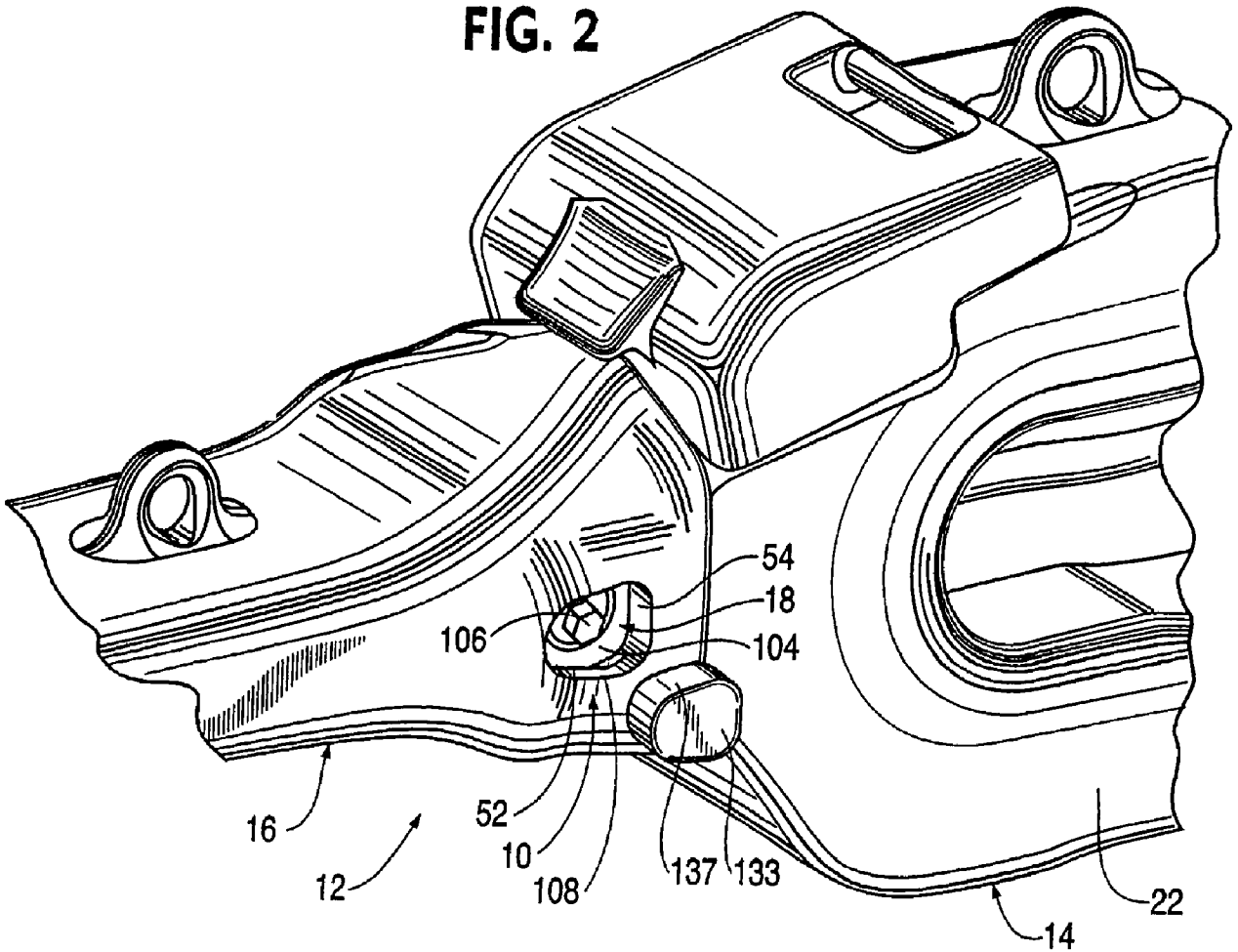
FIG. 2 is a perspective view of the tooth with the cap in exploded view.
Figure 3:
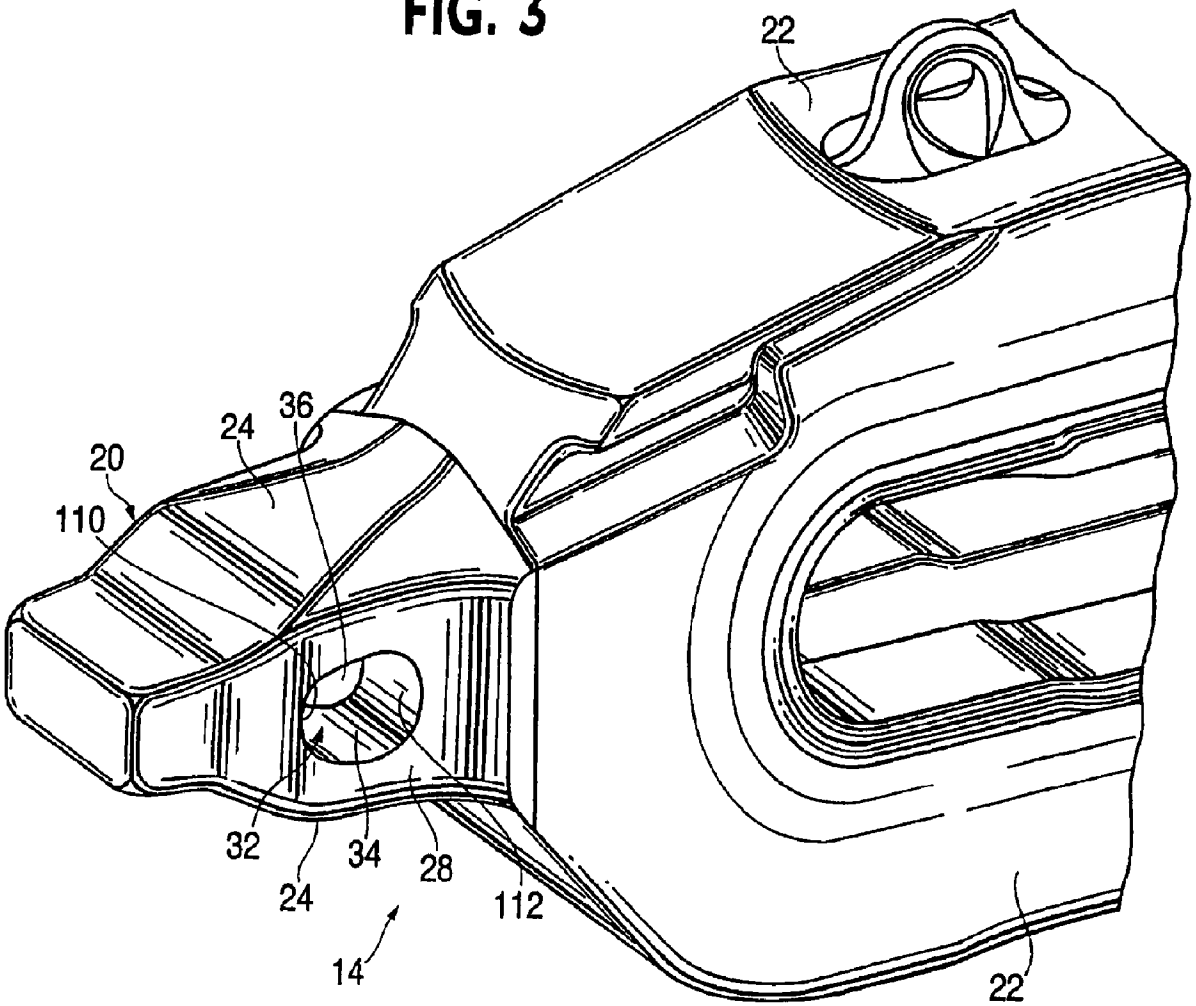
FIG. 3 is a perspective view of the adapter of the tooth.
Figure 5:
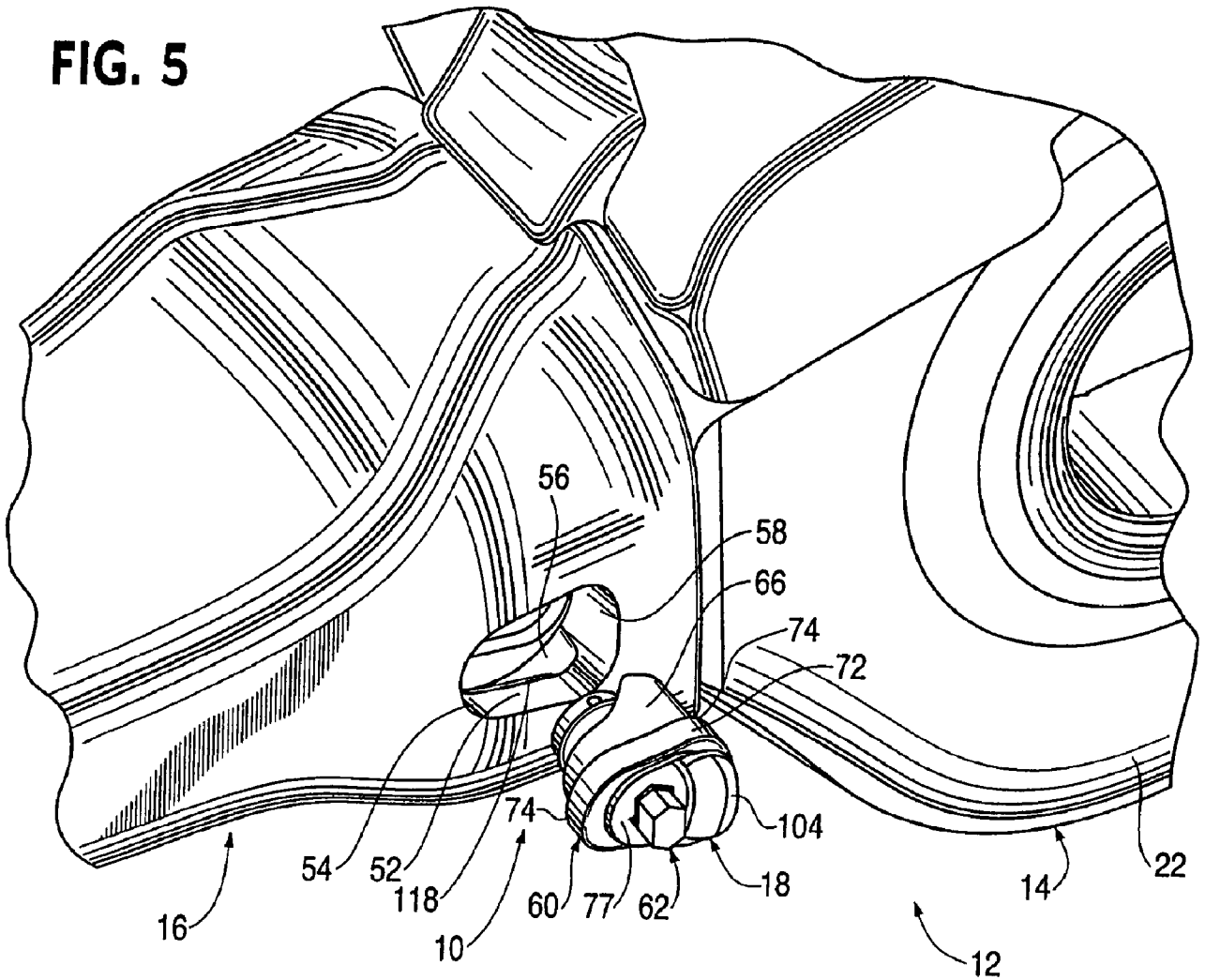
FIG. 5 is a perspective view of the tooth with the cap omitted and the lock in exploded view.
Figure 9:
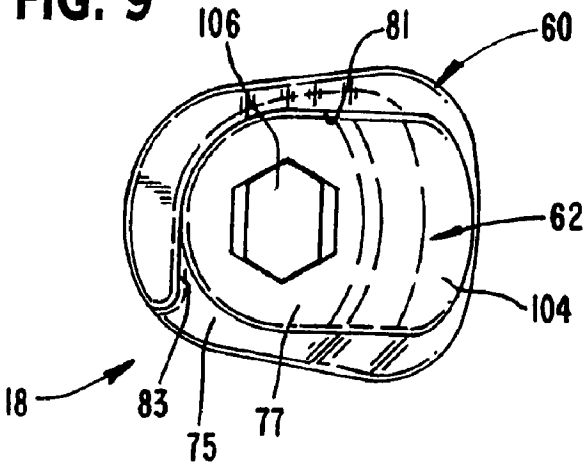
FIG. 9 is a front view of the lock with the locking member in a release position.
Figure 7:
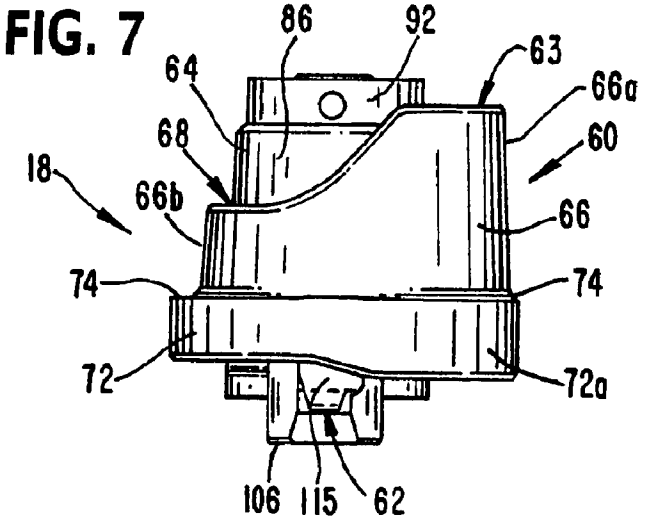
FIG. 7 is a side view of the lock with the locking member in a locked position.
Figure 8:
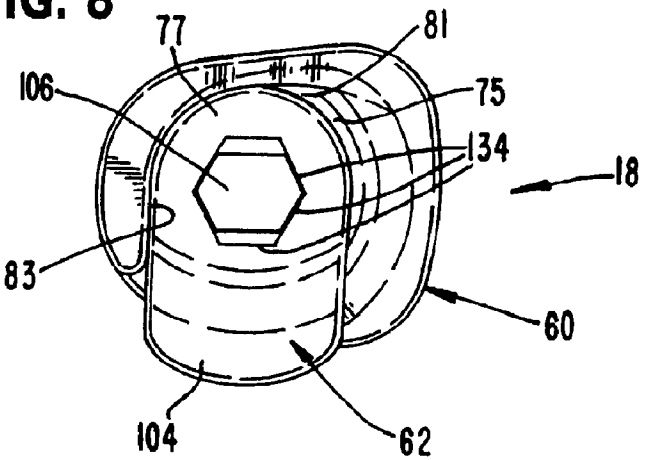
FIG. 8 is a front view of the lock with the locking member in the locked position.

In use, point 16 is placed onto nose 20 of adapter 14 such that one of holes 52 aligns with pocket 32 (FIG. 5). Lock 18 is then manually placed through hole 52 and into pocket 32. No hammering is necessary, though one may be used if desired to set the lock in place. The lock is inserted into pocket 32 until locator faces 74 abut sidewall 28. This positioning places the lock sufficiently inside of the exterior of the wear part 16 so that it is protected during the abrasive digging process. When the lock is installed, projection 77 is oriented in its release position such that flange 104 is positioned generally rearward. In this release position, flange 104 is within the bounds or peripheral cross sectional shape of body 60 (FIGS. 5 and 9). Once lock 18 is fully inserted into pocket 32, a wrench or the like (not shown) is used to rotate locking member 62 clockwise to the locked position (FIGS. 2 and 8). This rotation causes flange 104 to move outside of the bounds of body 60 and into recess 56 in point 16 such that extension 104 sets behind ledge portion 108 of sidewall 28. This arrangement positively holds the lock in the tooth without relying on the holding force of a resilient member subjected to loading or the tightness of fitting the lock into the tooth. While resilient member 64 inhibits turning of the locking member, as described below, it is not subjected to loading from the wear part during use. With the locking member in the locked position, the lock cannot be removed from tooth 12 even if the point and/or adapter are worn and loosely fit together.

Figure 6:
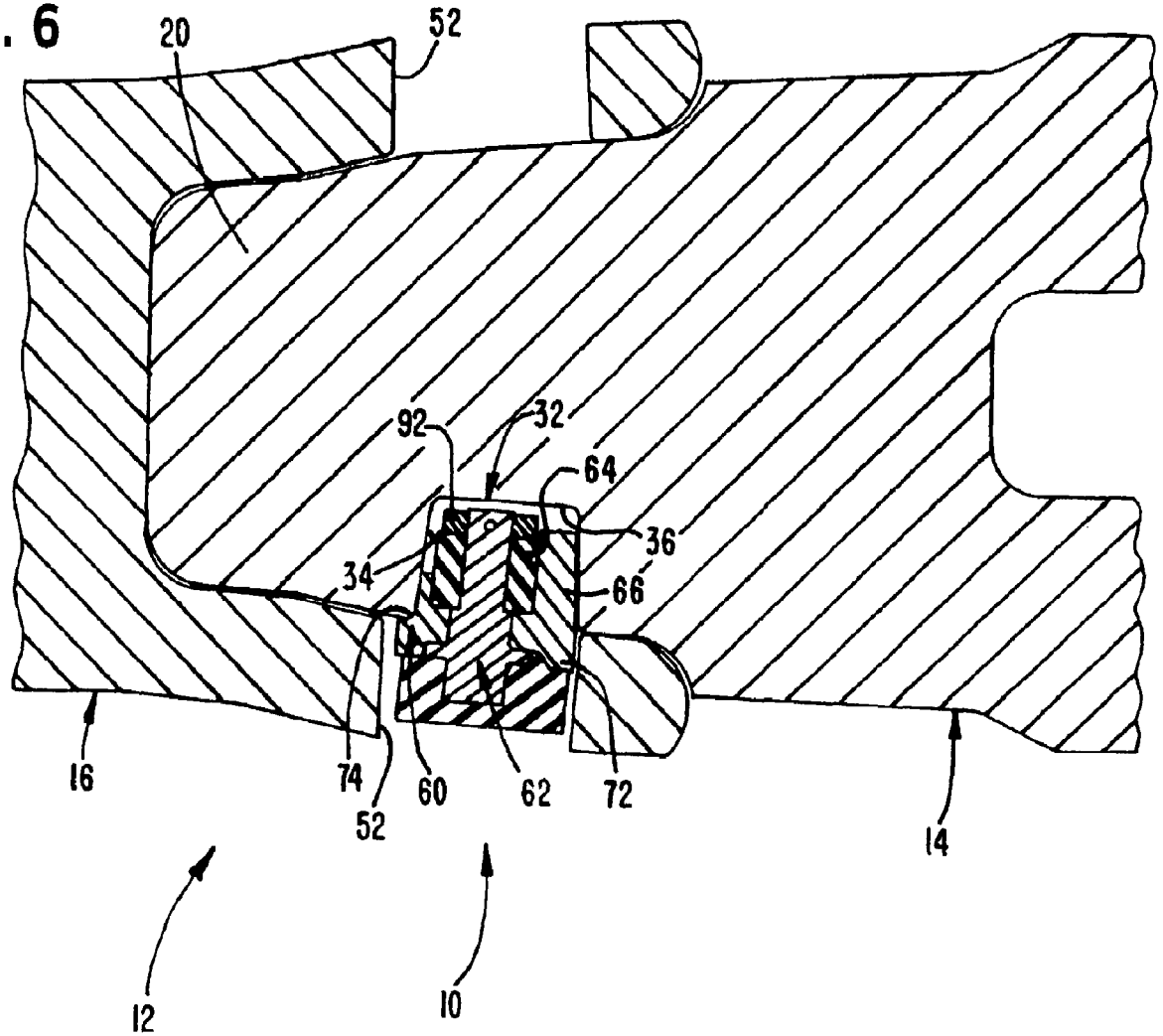
FIG. 6 is a cross sectional view taken along line 6-6 in FIG. 1.

Furthermore, with the lock in place, the rear bearing portion 72a of rim 72 opposes the rear wall portion 58 of hole 52 in point 16 to prevent removal of the point from the adapter nose (FIG. 6). With the application of forward pressure on the point, the rear wall portion of hole 52 presses against rim 72. The front portion 66b of retaining member 63, then, abuts against the front portion 110 of pocket 32. Since this pressure is applied along the outer sections of lock 18, a moment is also applied to the lock tending to urge the lock to rotate about a vertical axis (not shown). This motion is resisted by the elongate rear portion 66a of base 66 abutting the rear portion 112 of pocket 32 and the front locator face 74 abutting sidewall 28.

Figure 12:
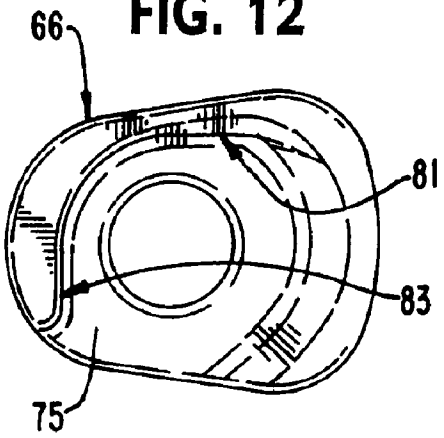
FIG. 12 is a front view of a retaining member of the lock.
Figure 10:
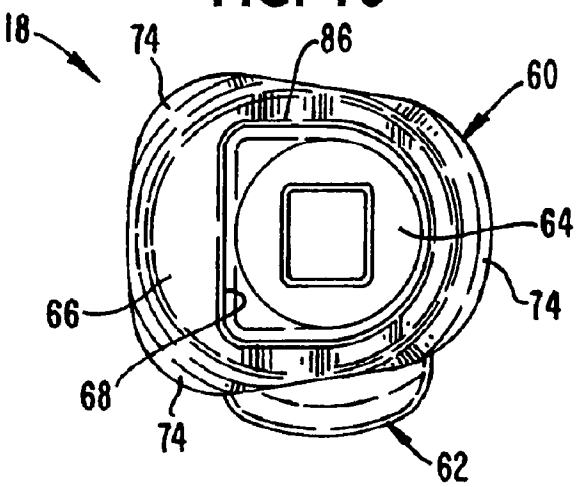
FIG. 10 is a rear view of the lock.
Figure 13:
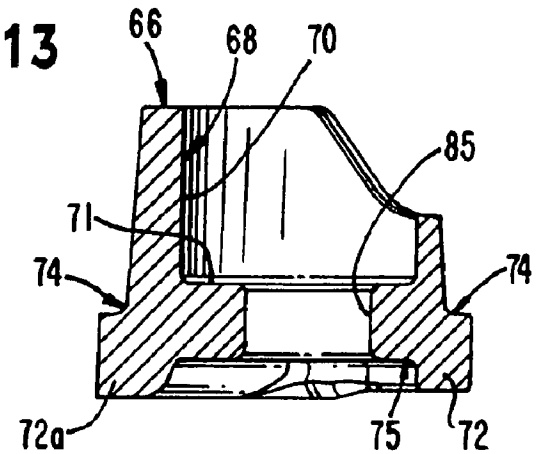
FIG. 13 is a cross sectional view taken along line 13-13 in FIG. 12.

Rotation of locking member 62 is resisted by the square shank portion 97 being received within the square passage 88 of resilient member 64 (FIG. 11). When the user rotates the locking member, the corners of shank portion 97 stretch the sidewalls of passage 88. While the resilient member is prefereably closely received in retaining member 63 with clearance for stretching being provided into the pocket, clearance may be provided between resilient member 64 and retaining member 63 to provide additional space for stretching of the material. Alternatively, the resilient member is composed of a compressible foam or the like. As the square shank portion 97 passes the over-center position, the resilient member urges the completion of a 90 degree rotation of the locking member, i.e., until the shank portion is again matingly received within passage 88. The square passage, then, tends to resist movement of the flange past the locked position or release position. Stops 81, 83 function to prevent rotation of the locking member in the wrong direction (FIGS. 8, 9 and 12). For instance, in the locked position, stop 83 prevents any further clockwise movement. In the release position, stop 81 prevents any further counter-clockwise movement of the locking member.

Figure 16:
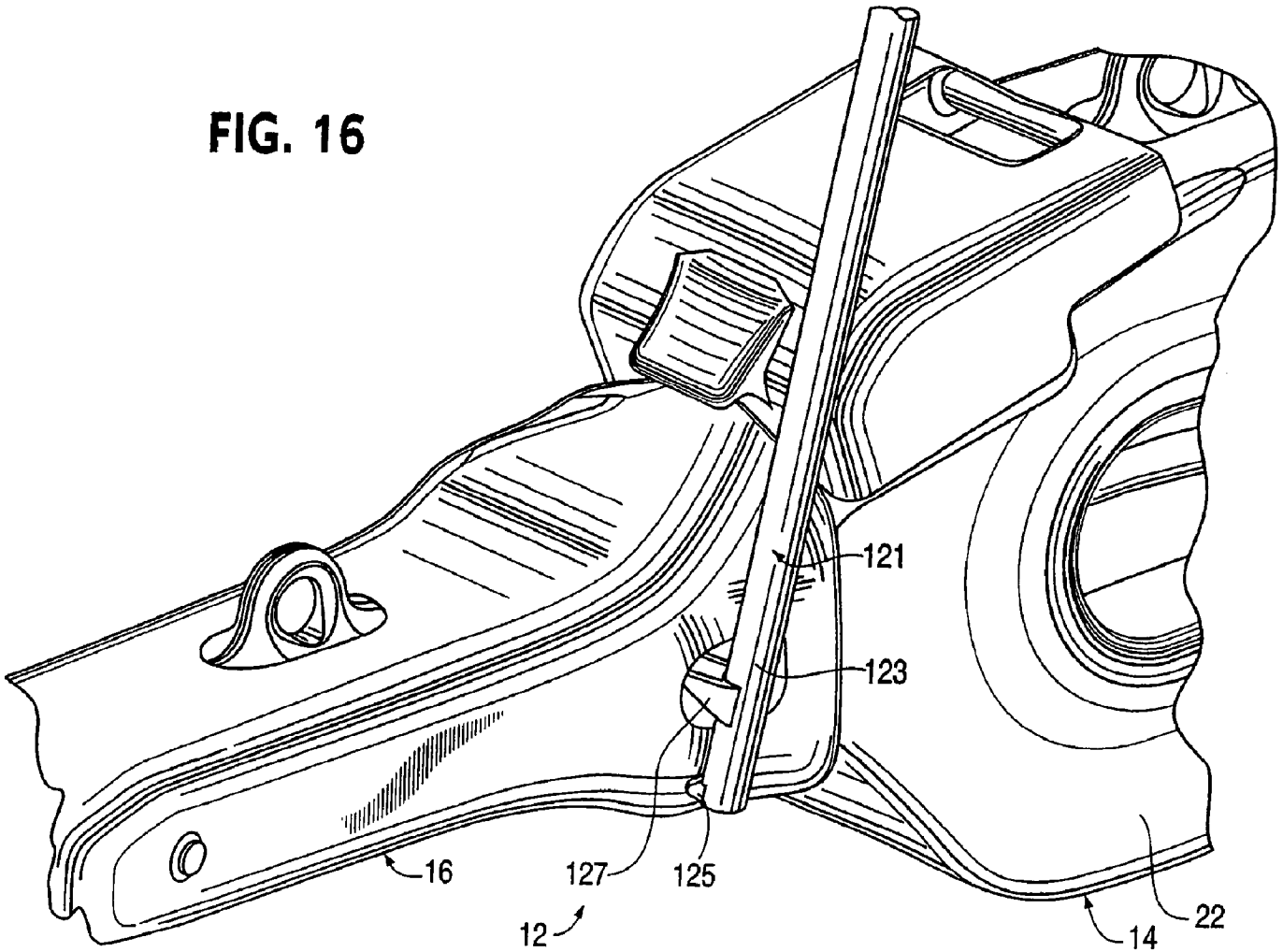
FIG. 16 is a perspective view illustrating the removal of the lock from the tooth with a pry tool in accordance with the present invention.
Figure 17:
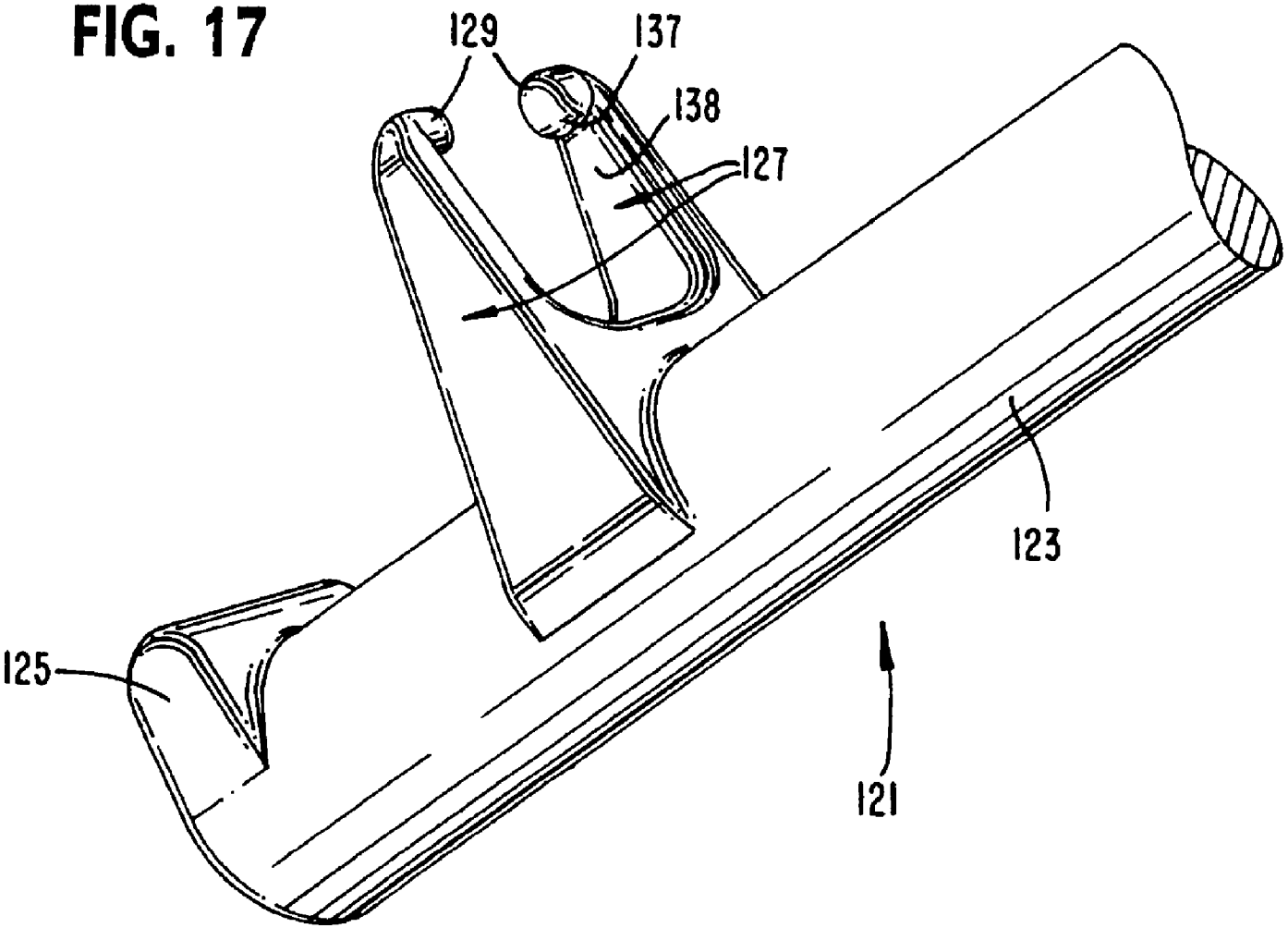
FIG. 17 is an enlarged, perspective view of a working end of the pry tool.
Figure 18:
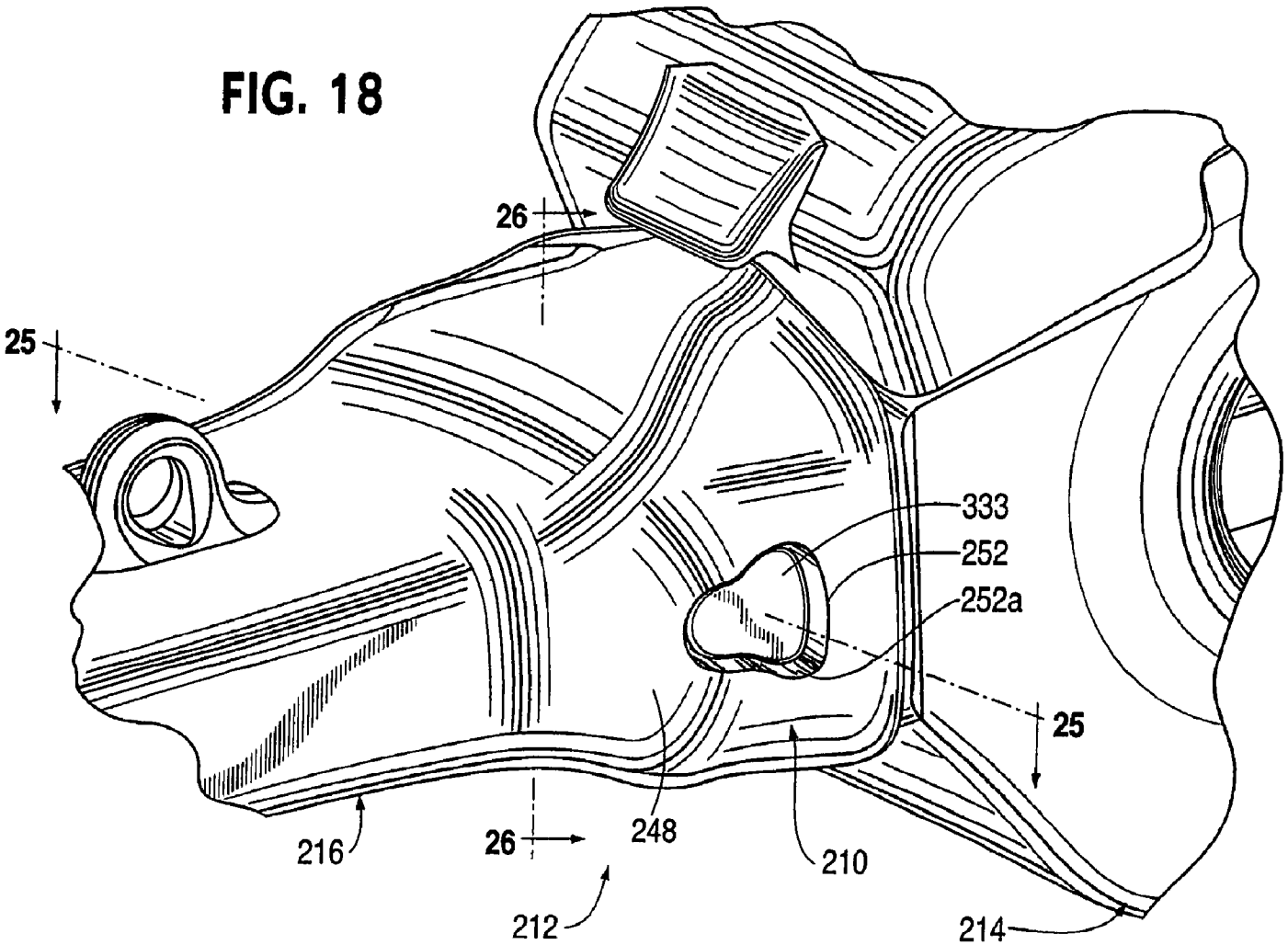
FIG. 18 is a perspective view of a tooth incorporating a second embodiment of a tooth in accordance with the present invention.
Figure 19:
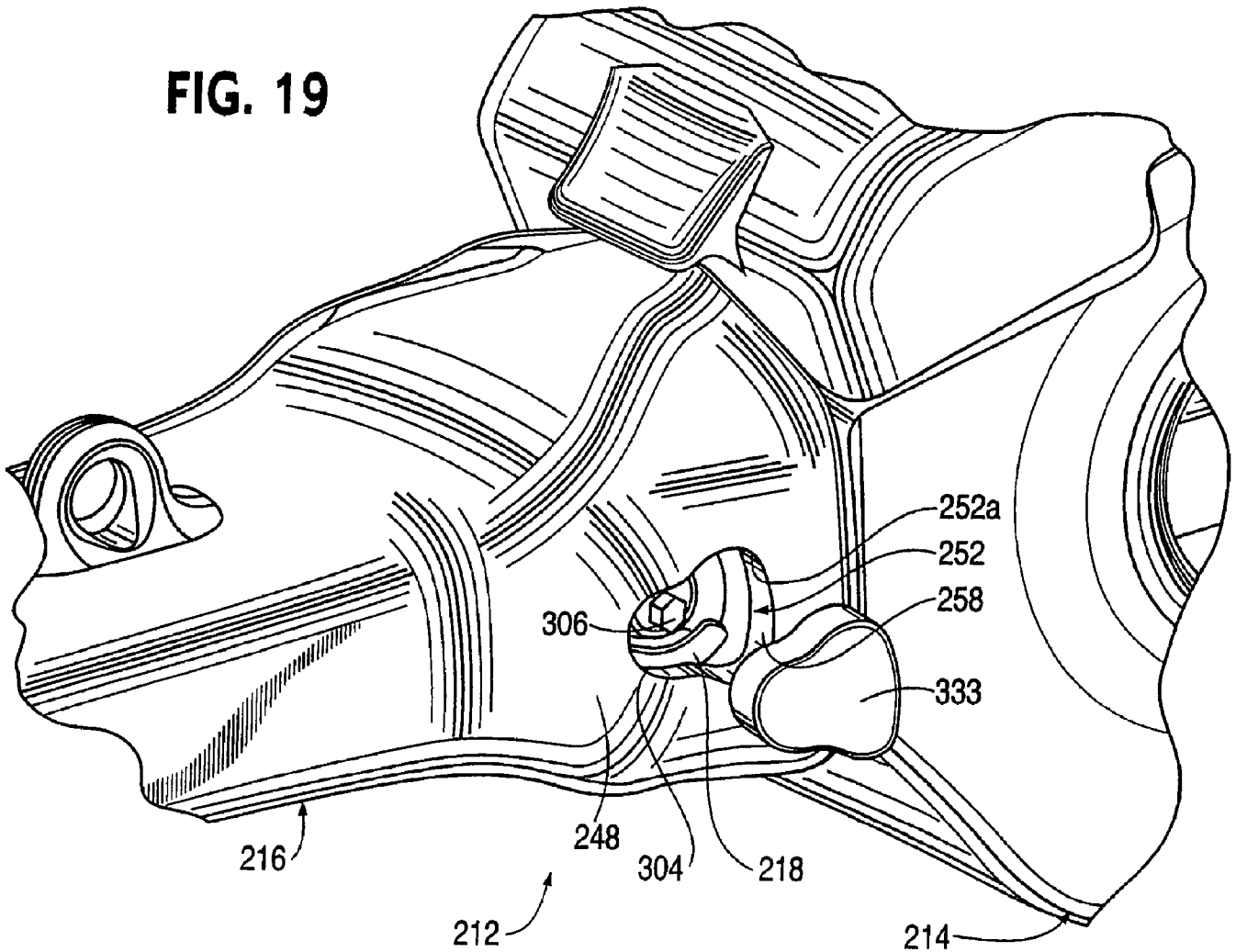
FIG. 19 is a perspective view of the second embodiment with the cap shown in exploded view.

If soil is of a loose, non-packing nature, the lock can usually be pulled from the assembly by hand. When soil is of a nature that packs, or even cements, the lock is preferably pried out of pocket 32 when the point needs to be removed from the adapter (FIG. 16). In a preferred construction, a pry relief 115 is formed on opposite sides of head 106. As seen in FIG. 15, the relief is a shallow depression bounded by a peripheral edge 117 except along one side 117a, which is open. The outer segment defines a pry edge 117b against which a pry tool engages the lock to pull the lock from the tooth. The pry edge 117b is a ramp surface at an angle of about 125 degrees to the floor 117d of the relief to hold cap in place but still permit removal of the cap when needed, although pry edge 117b could be varied and set at a wide range of angles.

A preferred pry tool 121 includes a lever 123, a fulcrum 125 on one end of the lever, and a pair of prying arms 127 (FIGS. 15 and 16). The arms each include a finger 129 that is directed inward so that they point toward each other. Each finger includes a gripping surface 137 at an angle of about 125 degrees relative to the inner surface 138 of arms 127 to match the angle of pry edge 117b, although gripping surface 137 could be varied and set at a wide range of angles. As seen in FIG. 15, open side 117a opens upwardly when locking member 62 is in the release position for removal of the lock. In use, fingers 129 are lowered into relief 115 via open side 117a, i.e., until they abut edge portion 117c. Fulcrum 125 is set against a lower part of point 16 and lever 123 is forced outward by the user. Gripping surfaces 137 on fingers 129 matingly engage pry edge 117b to pull the lock outwardly until the lock is fully removed from the tooth. Once lock 18 clears hole 52, the weight distribution of the lock swings the body downward such that the fingers continue to engage and hold edge 117c to temporarily hold the lock for the user to grasp. The lock can, then, be removed by manually sliding fingers 129 through open side 117a.

As noted above, if desired, a rubber or other elastomeric cap 133 can be fit within hole 52 to cover the hole and prevent the buildup fines around the lock. Preferably cap 133 includes a recess 135 that generally matches the shape of head 106. The receipt of head 106 in recess 135 firmly holds the cap in place. The cap is fully recessed within hole 52 so that it is shielded from various forces that may tend to eject it.

Head 106 is preferably formed to facilitate rotation of the locking member, prying of the lock, and installation and removal of a cap 133 adapted to plug hole 52 and inhibit the build up of fines around the lock during use. As seen in FIGS. 8 and 9, the head is formed with a hexagonal exterior (although other shapes could be used) to provide flats 134 for the engagement of a wrench (not shown). Chamfered surfaces 136 are provided adjacent two opposing flats 134 to enable the walls of the recess 135 in cap 133 to be received over the head to hold the cap in place (FIGS. 14 and 15).

In a second embodiment of the present invention, a lock 218 is used to secure a point 216 to an adapter 214 (FIGS. 18-32). In this embodiment, the lock applies a tightening force on the assembly as well as being installed without hammering and positively holding the lock in the tooth.

Figure 20:
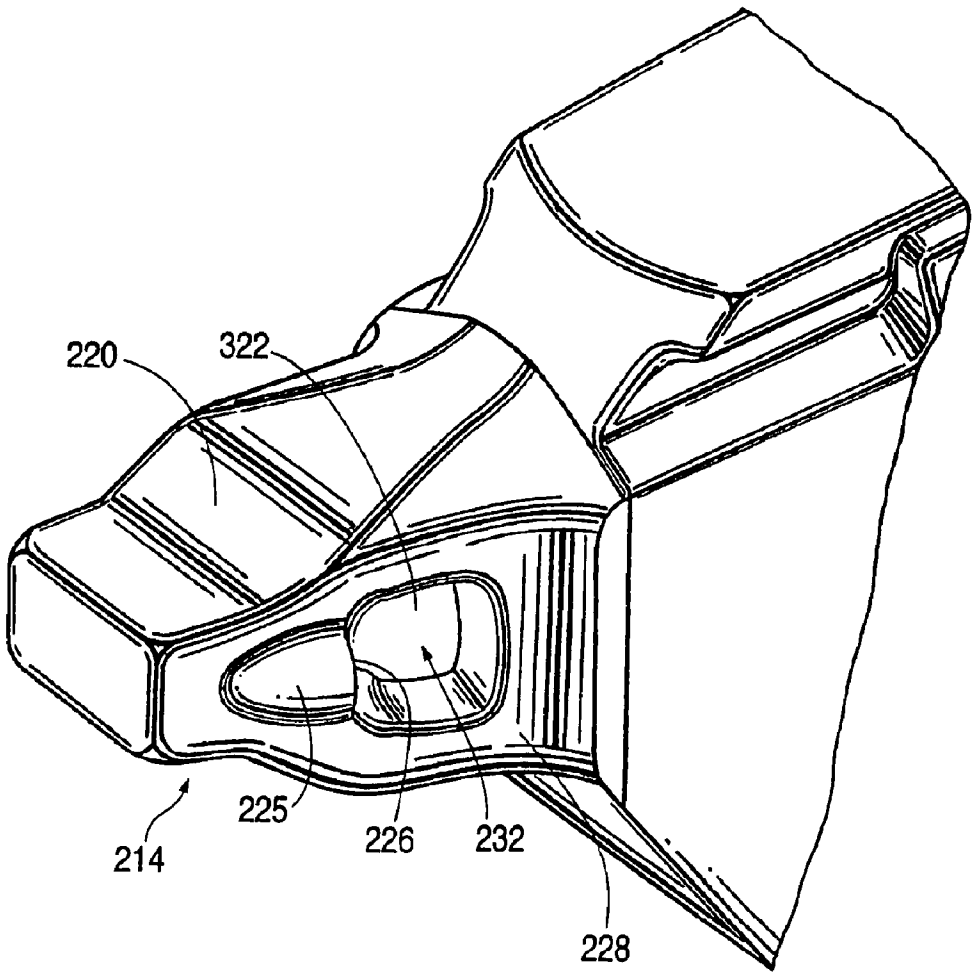
FIG. 20 is a perspective view of the adapter of the second embodiment.

Adapter 214 includes a nose 220 provided with a pocket 232 in one sidewall 228 for receiving lock 218 (FIG. 20). The pocket has a non-circular shape that narrows toward the front end, although other shapes could be used. Unlike adapter 14, adapter 214 includes a rib 225 that extends outward of sidewall 228 in front of pocket 232. Rib 225 has a tapered configuration that expands rearward to define a bearing face 226 for lock 218.

Figure 21:
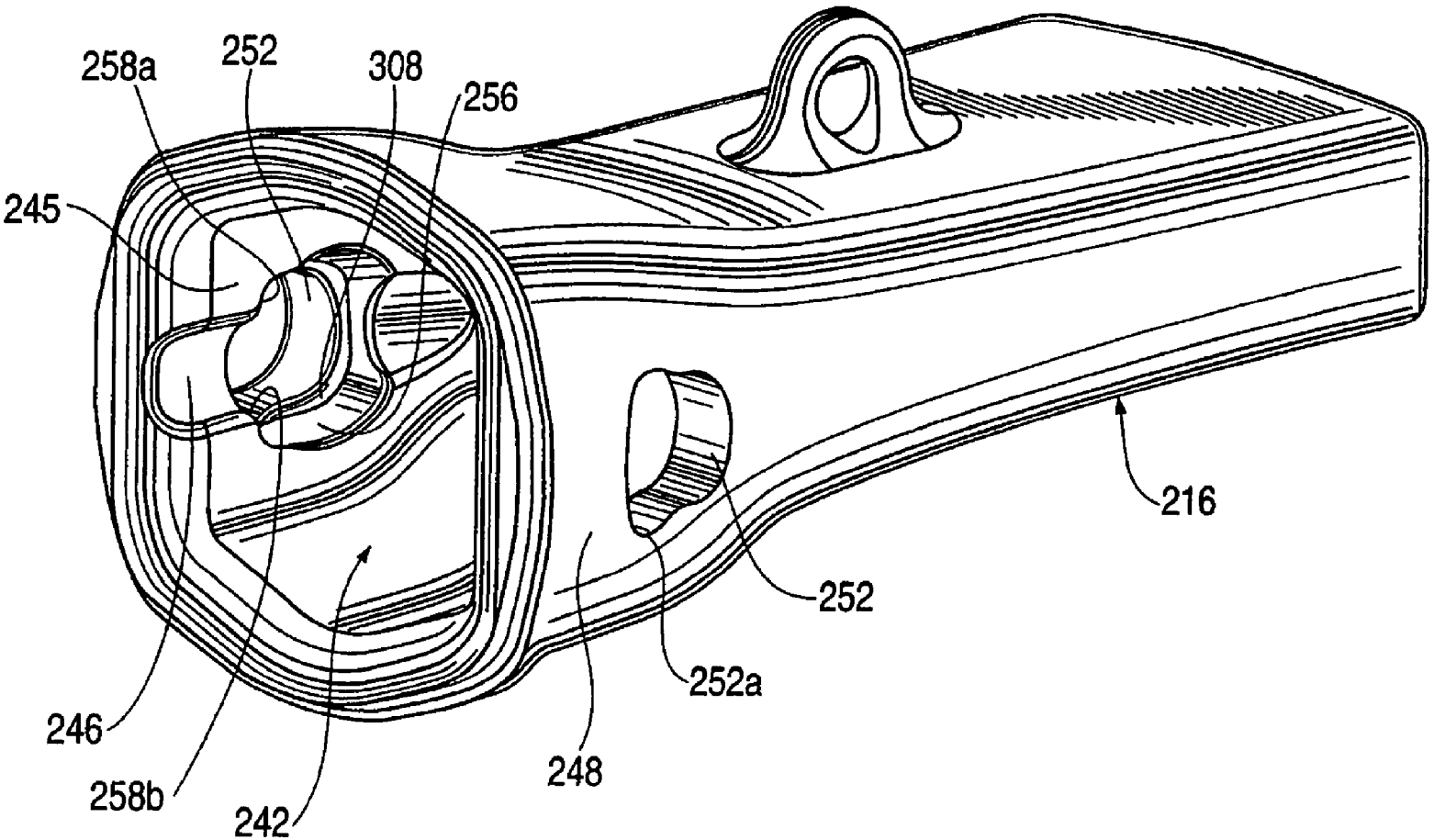
FIG. 21 is a perspective view of the point of the second embodiment.

Point 216 has a socket 242 into which is received nose 220, and holes 252 in sidewalls 248 to receive lock 218 (FIG. 21). Holes 252 each has a configuration to generally match the shape of the lock. The rear end of each hole 252 is vertically enlarged to receive the locking flange 304 extending from cam 277. The enlarged portion 252a ensures the user will properly insert the lock into the tooth. In order to accommodate rib 225, the interior surface 245 of each sidewall 248 includes a longitudinal channel 246 that extends from the rear end of the point to a position in front of hole 252.

In a preferred construction, lock 218 includes a body 260 and a locking member 262 (FIGS. 22-32). Locking member 262 is rotatably mounted within body 260 for movement between release and locked positions.

Figure 31:
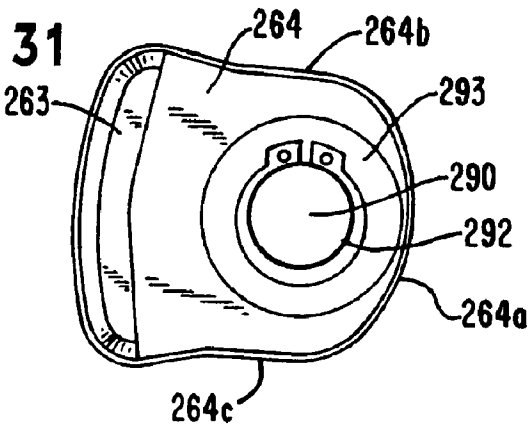
FIG. 31 is rear view of the lock of the second embodiment.
Figure 32:
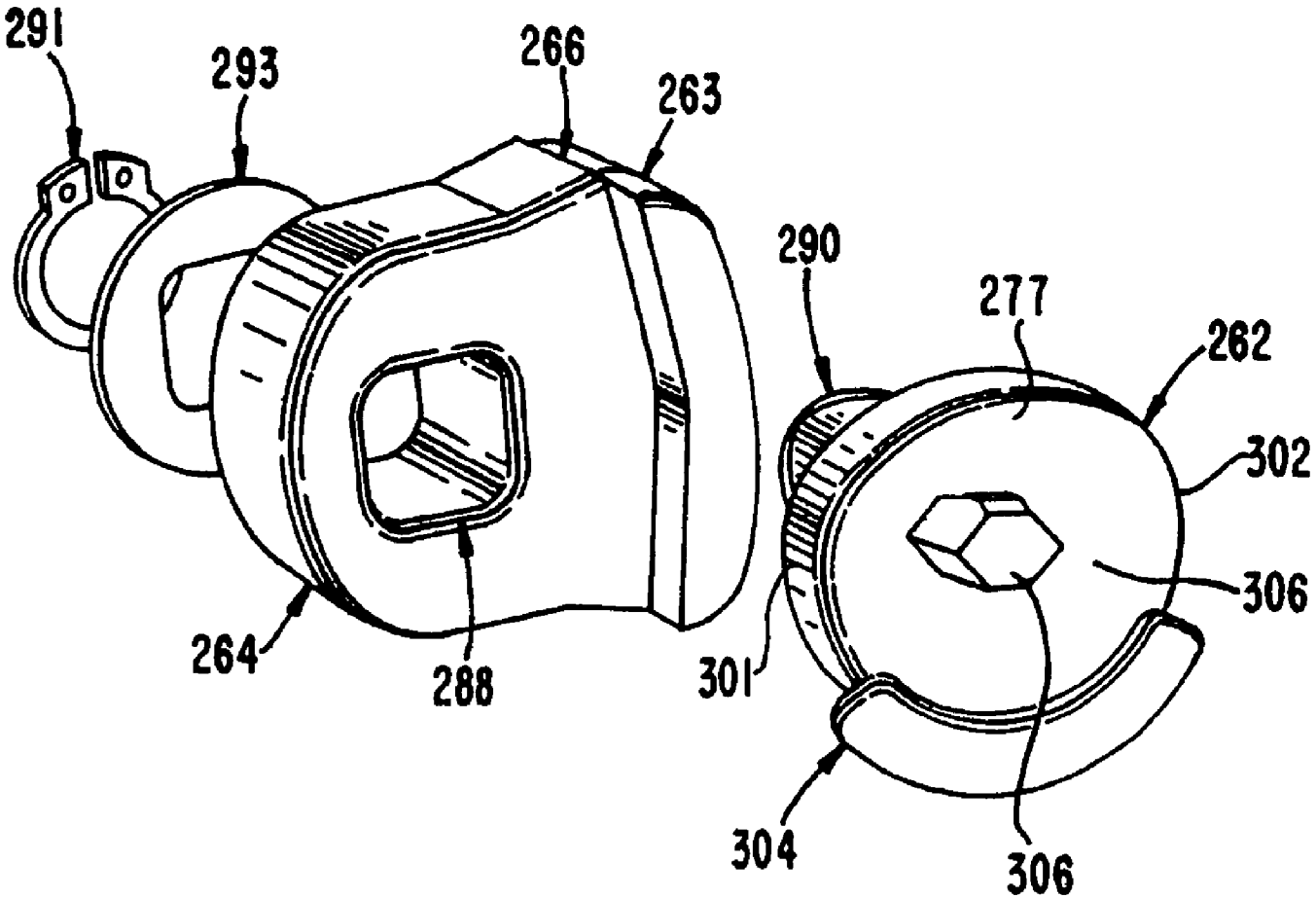
FIG. 32 is an exploded, perspective view of the lock of the second embodiment.

Body 260 comprises a resilient member 264 (composed of rubber or the like), which is bonded to a rigid retaining member 263 (FIGS. 22-32). The retaining member, in this embodiment, is a rear bearing member having a generally flat configuration. The resilient member has a block shape with a central passage 288 passing therethrough. In the preferred construction, the resilient member has a broadly curved front portion 264a, preferably along a generally circular arc), and generally flat surfaces 264b, 264c. These flat surfaces help prevent the body from turning when the locking member is rotated. Central passage 288 preferably has a square shaped (or other non-circular) cross section (FIG. 32). Resilient member 264 and retaining member 263 are bonded together by adhesive, being molded together, or other means. The ends 263c, 263d of retaining member 263 also help the body from turning when the locking member is rotated, in cooperation with the flat surfaces 264b, 264c of resilient member 264.

Locking member 262 includes a stem 290, a cam 277, a flange or tab 304, and a head 306. As with lock 18, stem 290 includes a shank portion 297 with a generally square cross section (or other non-circular shape) that is received in a square shaped passage 288. The square shank in the square passage operates as discussed above for lock 18. A collar 292 is preferably attached to the free end of stem 290 to secure locking member 262 to body 260. Collar 292 is preferably secured in place through the use of a roll pin inserted into aligned holes in the collar and stem. Alternatively, the collar could be replaced with a clip 291 and washer 293 as shown in FIGS. 31 and 32. In this embodiment, a clip 292 snaps onto stem 290 to trap resilient member 264 between clip 292 and frame member 267. The washer 293 is preferably placed between clip 292 and resilient member 264. Of course, other arrangements could be used.

Cam 277 is fixed to stem 290 and has a generally oblong shape. Flange 304 extends radially outward from the one side of cam 277 between ends 305, 307. Although flange 304 is illustrated with an elongate, arcuate shape, other shapes are possible. Head 306 has essentially the same shape as head 106 including flats and relief 315.

Figure 22:
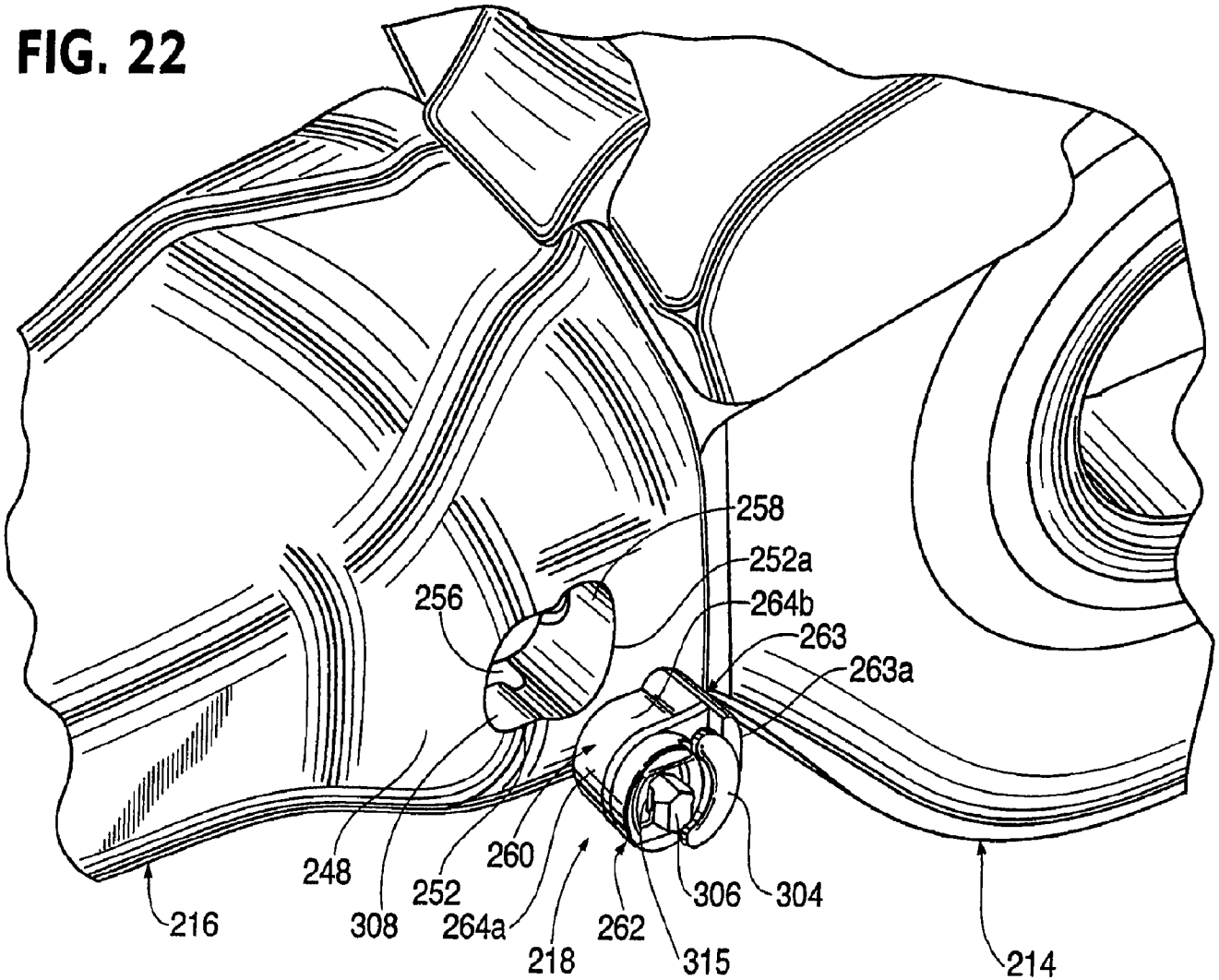
FIG. 22 is a perspective view of the second embodiment with the lock shown in exploded view.
Figure 24:
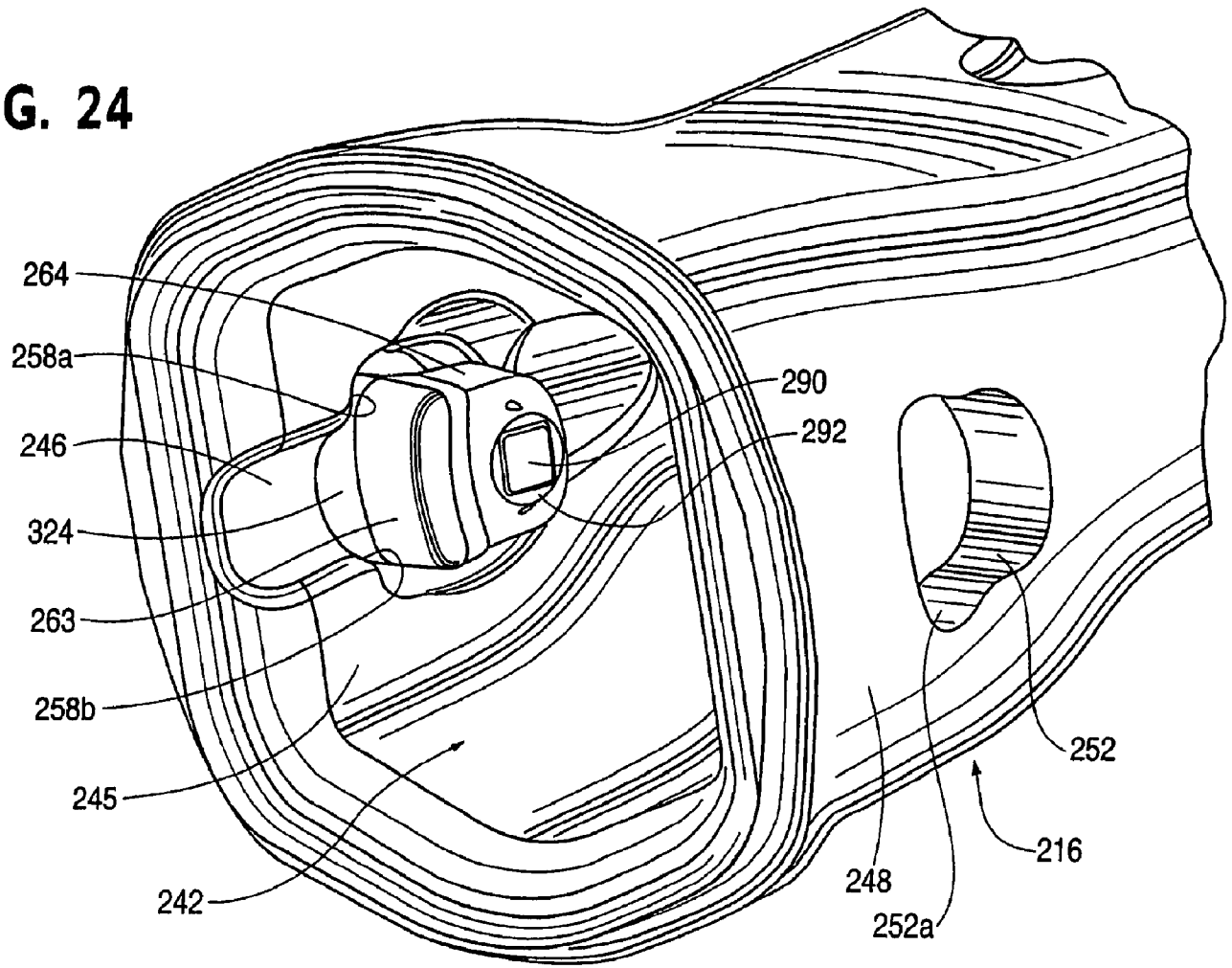
FIG. 24 is a perspective view of the point of the second embodiment with the lock shown in a hole in the point.
Figure 25:
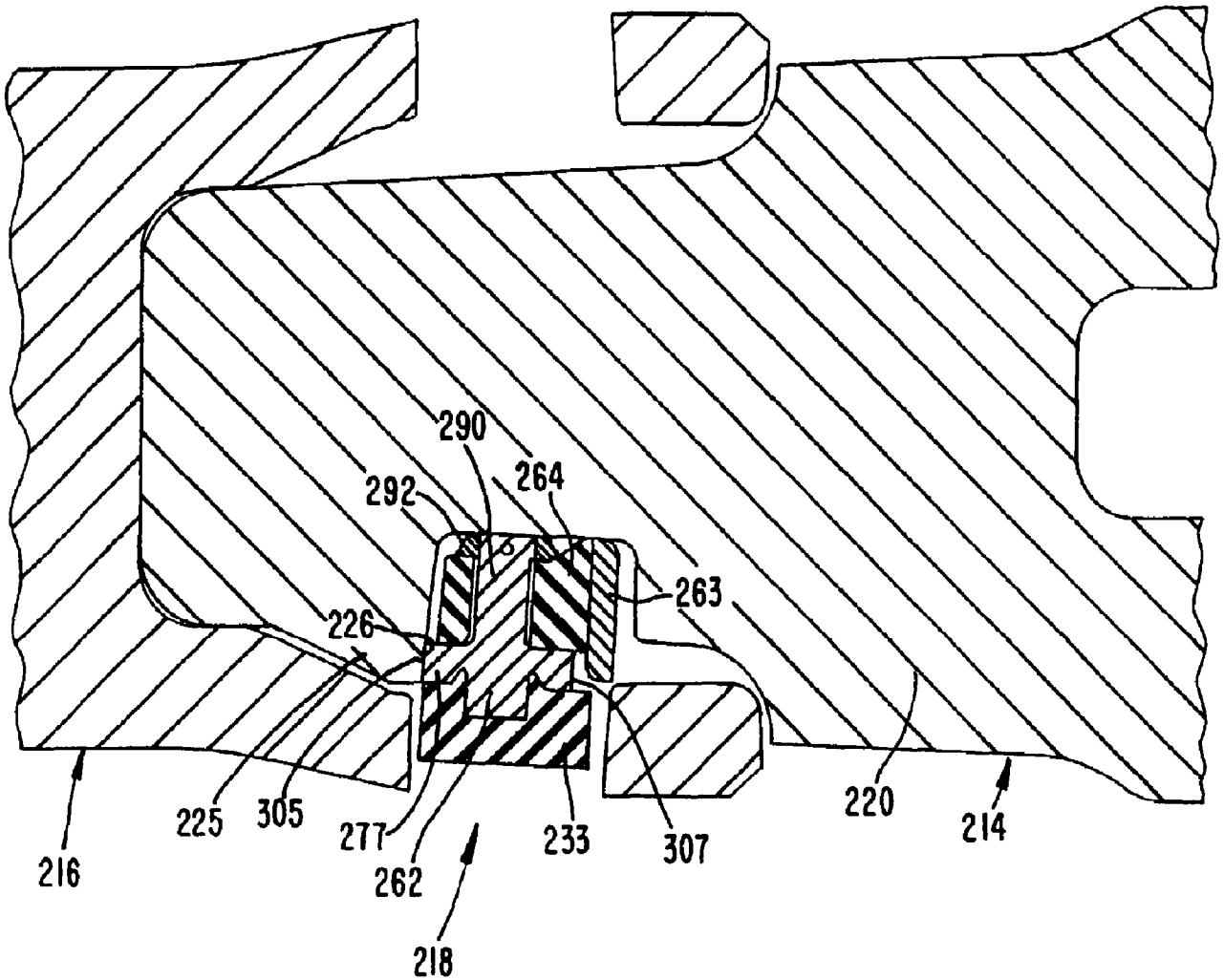
FIG. 25 is a cross-sectional view taken along line 25-25 in FIG. 18.
Figure 26:
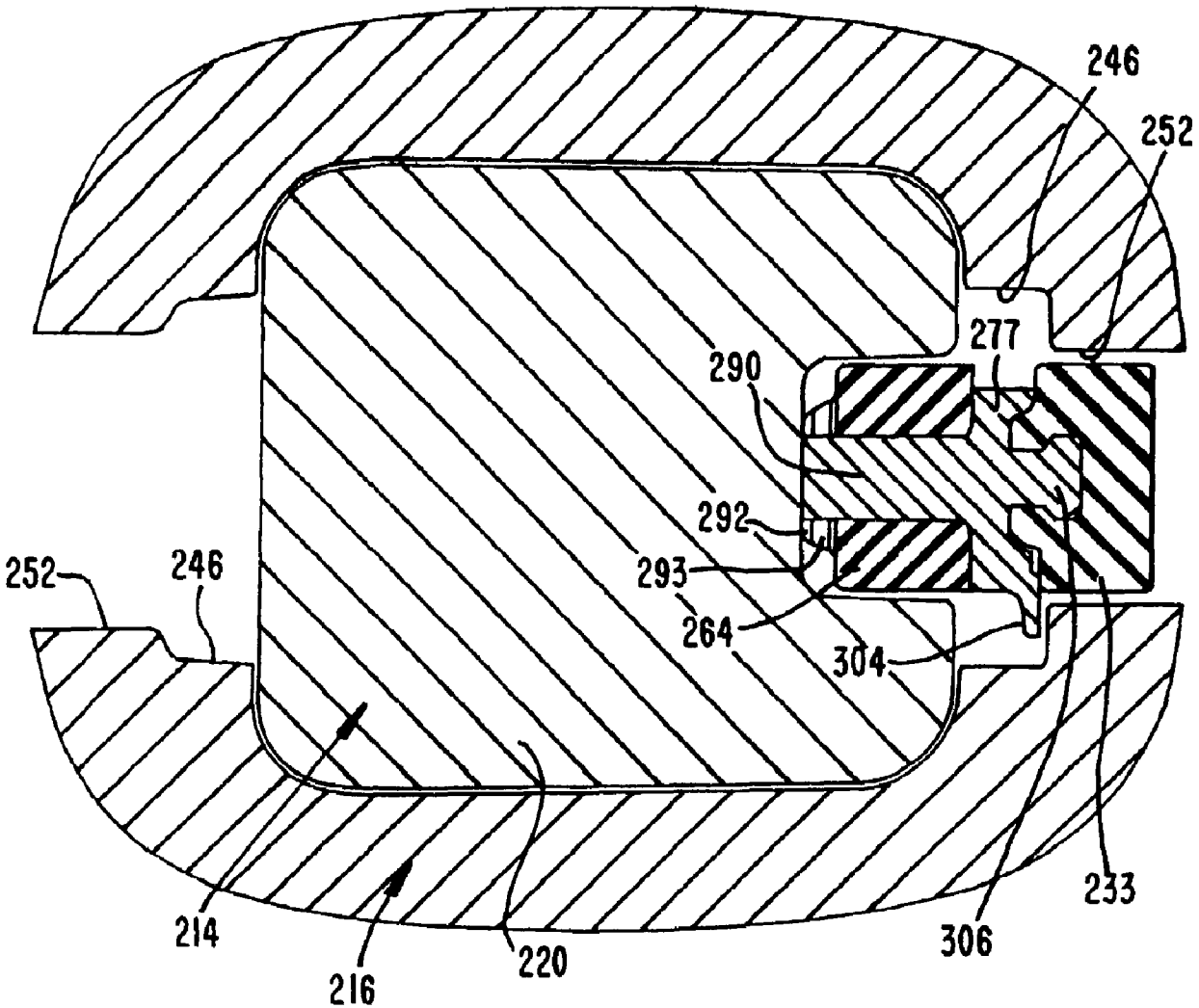
FIG. 26 is a cross-sectional view taken along line 26-26 in FIG. 18.
Figure 27:
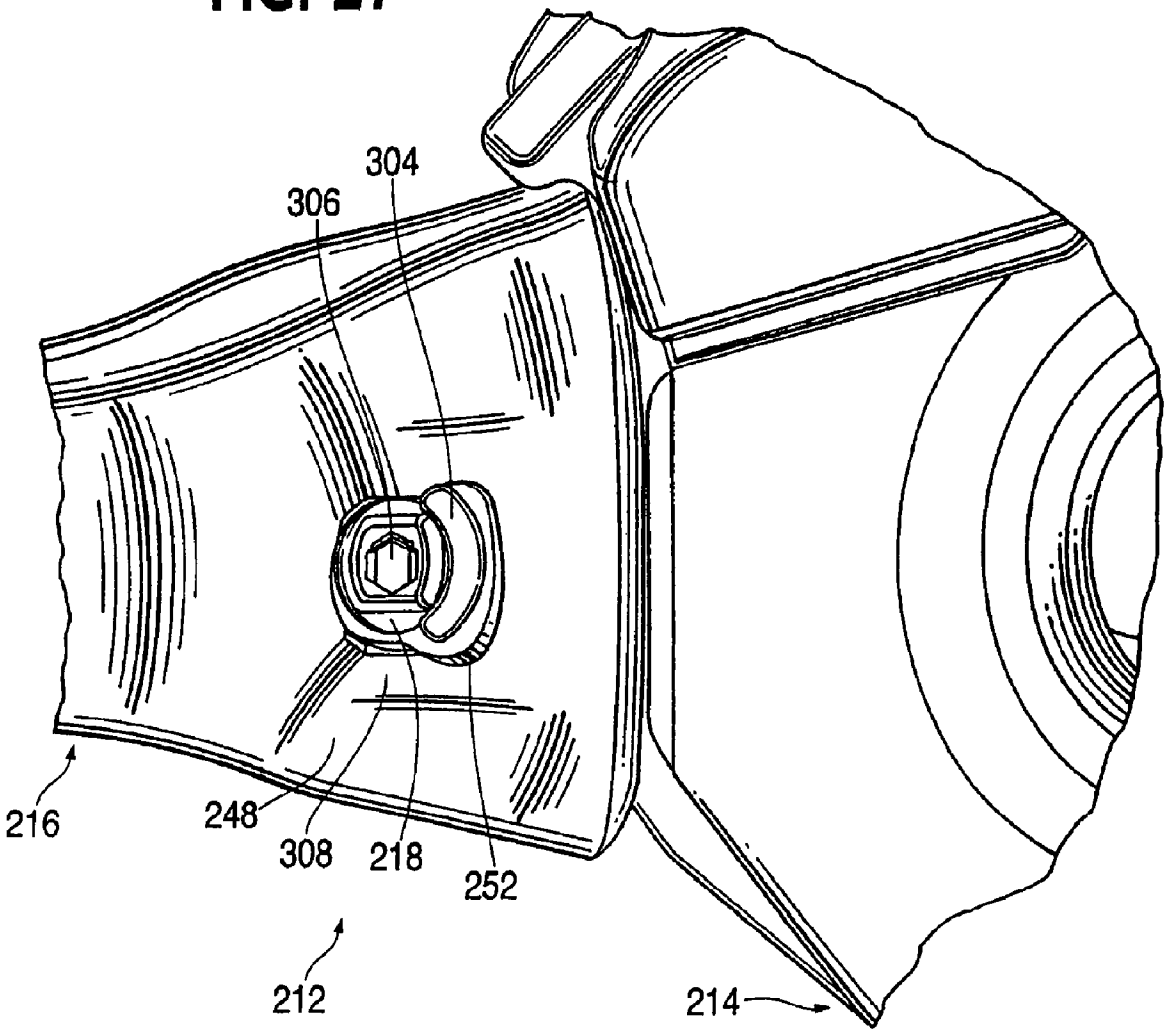
FIG. 27 is a side view of the tooth of the second embodiment with the locking member of the lock in the release position.
Figure 28:
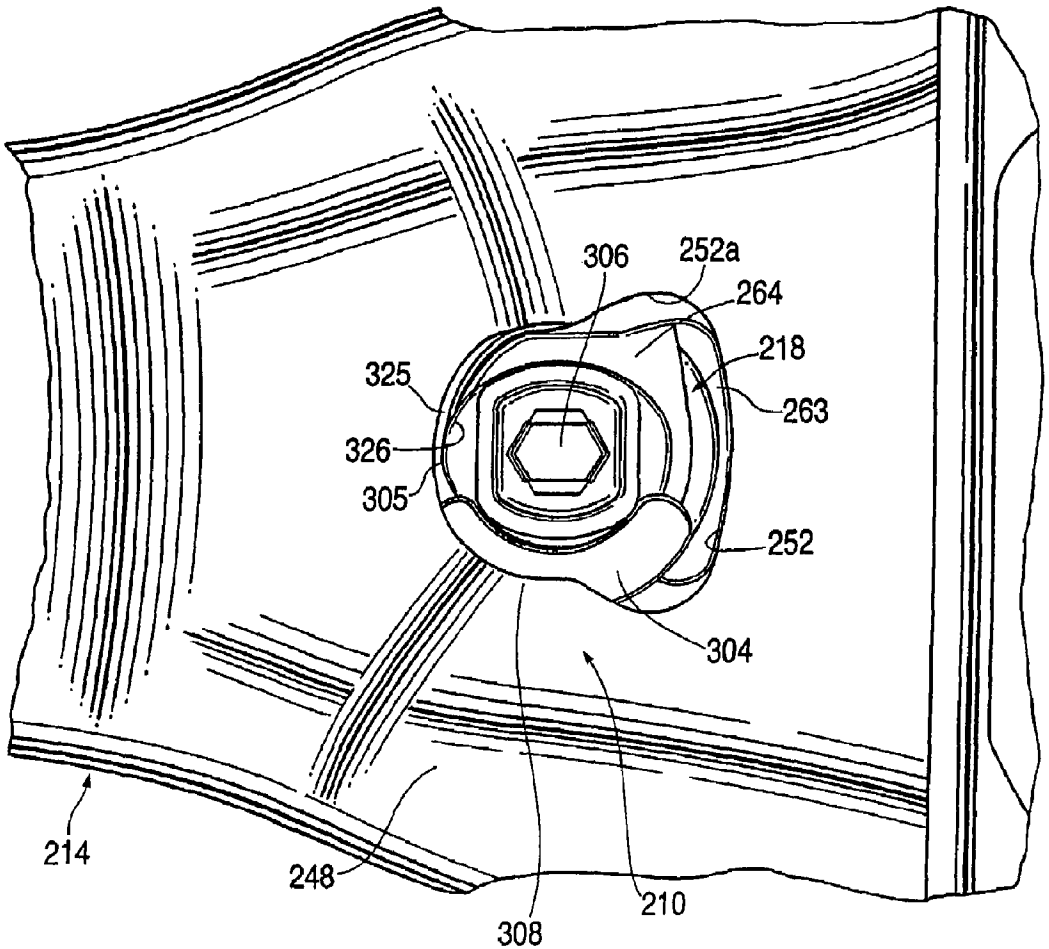
FIG. 28 is an enlarged side view of the lock portion of the tooth of the second embodiment with the locking member of the lock in the locked position.
Figure 29:
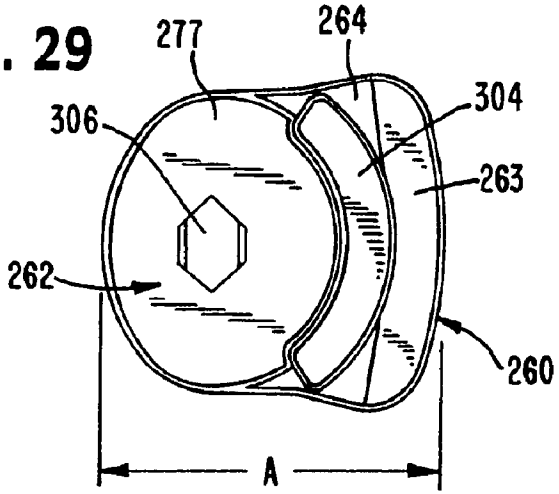
FIG. 29 is a front view of the lock of the second embodiment with the locking member in the release position.

In use, lock 218 is placed through hole 252 and into pocket 232 when locking member 262 is in its release position (FIG. 22). In the release position, lock 218 has a width A (FIG. 29). The lock is inserted into pocket 232 until the distal end 320 of stem 290 contacts the inner surface 322 of pocket 232. In this position, the outer portion 324 of retaining member 263 opposes the rear wall portion 258 of hole 252. However, because of channel 246, rear wall portion 258 defines two spaced apart bearing faces 258a, 258b to each side of channel 246 that abut bearing points 263a, 263b on retaining member 263 (FIGS. 21 and 24).

Figure 30:
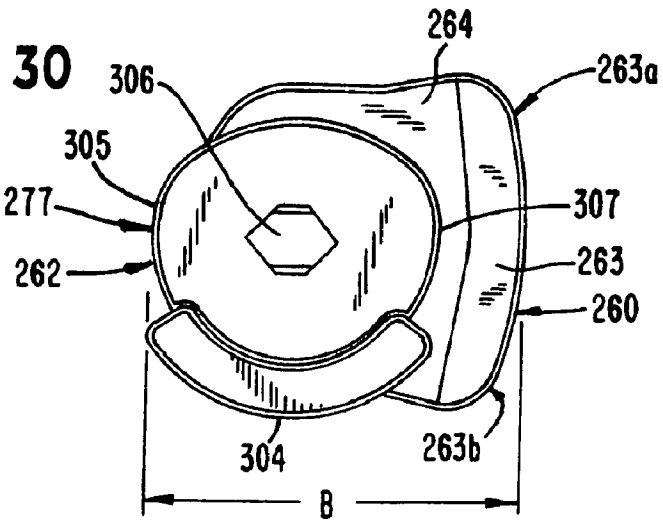
FIG. 30 is a front view of the lock of the second embodiment with the locking member in the locked position.

Once the lock is properly positioned, locking member 262 is rotated, preferably by engaging head 306 with a wrench (not shown). Cam 277 rotates such that end 305 presses against bearing face 226 to push the lock rearward. The pressure applied by cam 277 when rotated such that end 305 bears against rib 325 compresses resilient member 264 against retaining member 263. This rearward shifting of lock 218, in turn, pushes point 216 farther onto nose 220. As seen in FIGS. 29-30, lock 218 in the locked position has a width B, which is larger than width A. This increase in width generates a tightening function on the tooth assembly. Also, in the locked position, as with lock 18, flange 304 is rotated into recess 256 behind ledge 308 to positively retain lock 218 in pocket 232 and thereby prevent unwanted ejection of the lock.

Figure 23:
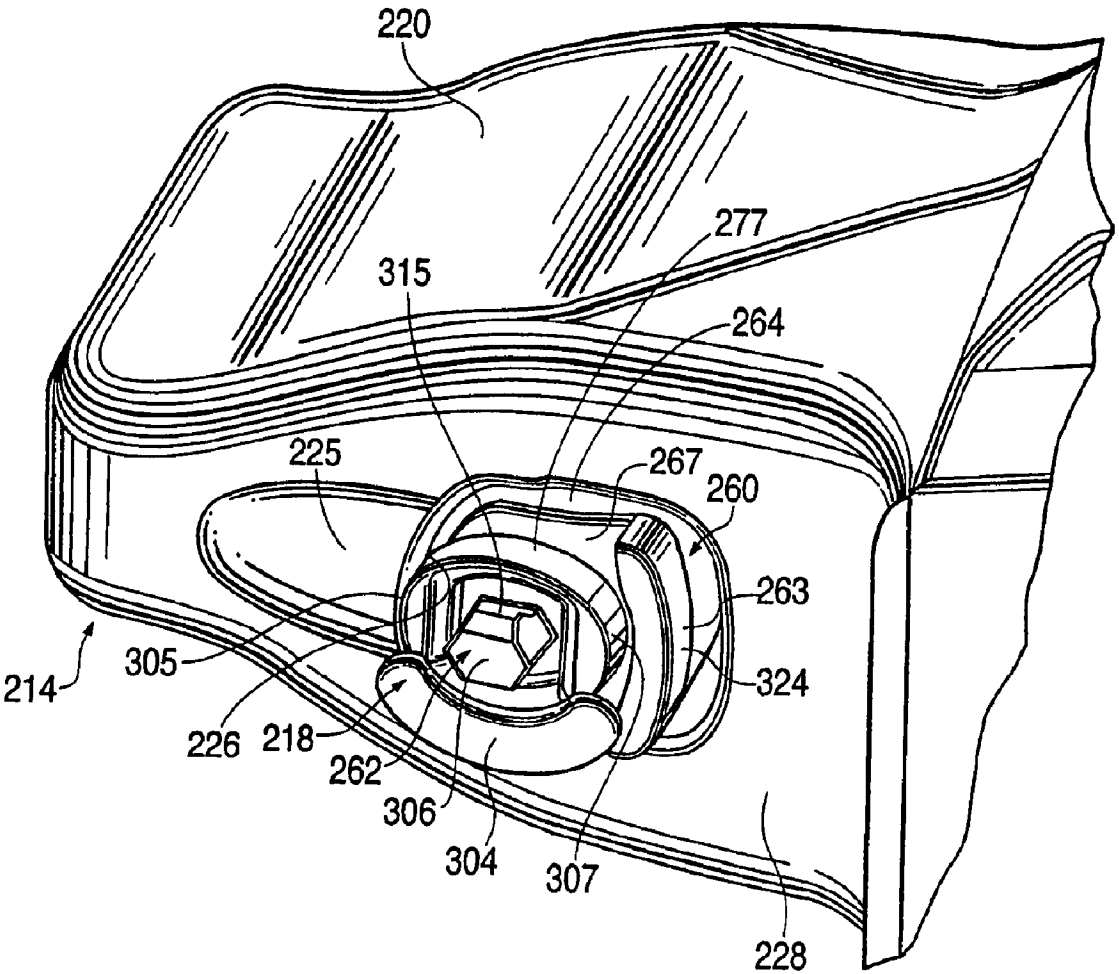
FIG. 23 is a perspective view of the adapter of the second embodiment with the lock shown in the pocket.

When the lock is to be removed from the tooth or other assembly, cam 277 is rotated counterclockwise to the release position. Although the use of a cap 333 is usually effective to keep fines from building up around head 306, fines are often forced into hole 252 around the cap so as to accumulate in every available opening. As can be seen in FIG. 23, cam 277 is aligned with outer portion 324 of retaining member 263. Accordingly, a small gap exists between end 307 and the front surface of retaining member 263. Since this gap will usually compact with fines, the bottom half of the periphery of cam 277 extending between 305 and 397 (behind flange 304) preferably conforms to a substantially circular arc to avoid resistance caused by fines in the gap. The upper half of the periphery of the cam between ends 305 and 307 (which faces forward in the release position) preferably conforms to a substantially elliptical arc to effect the camming function as the cam is rotated (i.e., effects the different widths A and B) Nevertheless, other shapes are possible.

To minimize the creation of moments within the lock, the rotational center of cam 277 is preferably aligned with bearing face 226 of nose 220, outer bearing portion 324 of retaining member 263 and rear wall portion 258 of point 216. Moreover, this alignment of cam 277 with the outer portion 324 of retaining member 263 enables the retaining member to act as a backstop to the movement of the cam when resilient member 264 deforms significantly under heavy side loading.

These and other embodiments in accordance with the present invention can be used in conjunction with excavating teeth, other wear members, or other separable components. The described embodiments are intended to be illustrative and not limiting of the scope of the invention.

I claim:

1. A wear assembly for an excavating bucket comprising:

a base fixed to the excavating bucket and including a nose;

a wear part having a socket to receive the nose, and a hole extending through the wear part to open in the socket, the hole having a peripheral outline; and a lock for releasably holding the wear part to the base, the lock including (i) a locking member having a stem and a lateral projection extending from the stem in a fixed relation to the stem, the locking member being rotatable about a longitudinal axis of the stem between a release position and a locking position with the lateral projection being axially aligned with the hole in the release position so that the lateral projection can be received through the hole and at least partially outside of the peripheral outline of the hole in the locking position such that the lateral projection is set between the nose and the wear part free of loading pressure from the wear part to prevent release of the lock, and (ii) a resilient member in contact with the locking member to resist turning of the locking member from the locking position to the release position during use and to permit turning of the locking member to the release position by an operator when removal is desired.

2. A wear assembly in accordance with claim 1 wherein a passage extends through the resilient member and the stem is received in the passage.

3. A wear assembly in accordance with claim 2 wherein the stem and the passage have complementary non-circular cross-sectional shapes for alternatively holding the locking member in the release position and the locking position.

4. A wear assembly in accordance with claim 1 wherein the stem has an end formed with a non-circular configuration adapted to engage a tool for turning the stem between the release and locking positions.

5. A wear assembly in accordance with claim 1 wherein the lock has an axial length that is the same in each of the release and locking positions.

6. A wear assembly in accordance with claim 1 wherein the lock remains at substantially the same depth in the wear part and the base in both the release position and the locking position.

7. A wear assembly in accordance with claim 1 wherein the wear part is a point of an excavating tooth.

8. A wear assembly in accordance with claim 1 wherein the base includes a pocket generally aligned with the hole in the wear member, and the resilient member is received into the pocket.

9. A wear assembly in accordance with claim 1 wherein the stem rotates relative to the resilient member in moving from the locking position to the release position.

10. A wear assembly in accordance with claim 1 wherein the resilient member is composed of an elastomer.

11. A wear assembly in accordance with claim 1 wherein the stem and the lateral extension are rigid.

12. A wear assembly in accordance with claim 1 wherein the resilient member includes an opening for receiving the stem of the locking member.

13. A wear assembly in accordance with claim 12 wherein the opening generally conforms to a portion of the stem received into the opening.

14. A wear assembly in accordance with claim 13 wherein the resilient member surrounds the stem of the locking member.

15. A wear assembly in accordance with claim 1 wherein the resilient member is formed as a one-piece elastomer.

16. A lock for holding a wear part to a base that is fixed to an excavating bucket comprising:

a locking member having a stem and a lateral projection extending from the stem in a fixed relation to the stem, the locking member being rotatable about a longitudinal axis of the stem between a release position and a locking position with the lateral projection being axially aligned with a hole in the wear part when the locking member is in the release position so that the lateral projection can be received through the hole and at least partially outside of a peripheral outline of the hole in the locking position such that the lateral projection is set between the nose and the wear part free of loading pressure from the wear part to prevent release of the lock; and a resilient member in contact with the locking member to resist turning of the locking member from the locking position to the release position during use and to permit turning of the locking member to the release position by an operator when removal is desired.

17. A lock in accordance with claim 16 wherein a passage extends through the resilient member, and the stem is received in the passage.

18. A lock in accordance with claim 17 wherein the stem has a non-circular shape, and the passage has a complementary non-circular shape that contacts the non-circular shape of the stem for alternatively holding the stem in the release position and the locking position.

19. A lock in accordance with claim 16 wherein the stem has an end formed with a non-circular configuration adapted to engage a tool for turning the stem between the release and locking positions.

20. A lock in accordance with claim 16 which has an axial length that is the same in each of the release and locking positions.

21. A lock in accordance with claim 16 wherein the resilient member is composed of an elastomer.

22. A wear assembly for an excavating bucket comprising:

a base fixed to the excavating bucket and including a nose;

a wear part having a socket to receive the nose, and a hole extending through the wear part to open in the socket, the hole having a peripheral outline; and a lock for releasably holding the wear part to the base, the lock including a locking member and a resilient member, the resilient member including an opening defining a passage for receiving the locking member, and the locking member being rotatable within the passage of the resilient member between a locking position where the lock secures the wear part to the base and a release position rotationally spaced from the locking position, wherein the resilient member and the locking member have non-circular formations that engage each other in the locking position to resist the movement of the locking member from the locking position during use, and wherein the resilient member flexes to disengage the formations when the locking member is turned by an operator to the release position.

23. A wear assembly in accordance with claim 22 wherein the locking member includes a radially extending flange that moves in an arc about the rotational axis when the locking member moves from the release position to the locking position.

24. A wear assembly in accordance with claim 23 wherein the locking member includes a formation on one end to engage a tool to turn the locking member from the release position to the locking position.

25. A wear assembly in accordance with claim 24 wherein the passage is non-circular to receive a complementary exterior surface of the locking member in the release and locking positions.

26. A wear assembly in accordance with claim 25 wherein the resilient member is in a first state when the locking member is in the release position and in the locking position and in a second state where the resilient member is flexed relative to the first state while the locking member is turned between the release position and the locking position.

27. A wear assembly in accordance with claim 22 wherein the locking member includes a formation on one end to engage a tool to turn the locking member from the release position to the locking position.

28. A wear assembly in accordance with claim 22 wherein the passage is non-circular to receive a complementary exterior surface of the locking member in the release and locking positions.

29. A wear assembly in accordance with claim 22 wherein the resilient member is in a first state when the locking member is in the release position and in the locking position and in a second state where the resilient member is flexed relative to the first state when the locking member is between the release position and the locking position.

30. A wear assembly in accordance with claim 22 wherein the resilient member is composed of an elastomer.

31. A wear assembly in accordance with claim 22 wherein the opening in the resilient member is a through-hole that completely surrounds the locking member.

32. A lock for releasably holding a wear part to a base fixed to excavating equipment, the lock comprising a locking member and a resilient member, the resilient member including an opening defining a passage for receiving the locking member, and the locking member being rotatable within the passage of the resilient member between a locking position where the lock secures the wear part to the base and a release position rotationally spaced from the locking position, wherein the resilient member and the locking member have non-circular formations that engage each other in the locking position to resist the movement of the locking member from the locking position during use, and wherein the resilient member flexes to disengage the formations when the locking member is turned by an operator to the release position.

33. A wear assembly in accordance with claim 32 wherein the opening in the resilient member is a through-hole that completely surrounds the locking member.

* * * * *